(12) United States Patent
Matsui

(10) Patent No.: US 8,443,020 B2
(45) Date of Patent: May 14, 2013

(54) PSEUDO RANDOM NUMBER GENERATOR

(75) Inventor: Mitsuru Matsui, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1168 days.

(21) Appl. No.: 11/666,156

(22) PCT Filed: Sep. 9, 2005

(86) PCT No.: PCT/JP2005/016586

§ 371 (c)(1),
(2), (4) Date: Apr. 24, 2007

(87) PCT Pub. No.: WO2007/029330

PCT Pub. Date: Mar. 15, 2007

(65) Prior Publication Data

US 2007/0266067 A1 Nov. 15, 2007

(51) Int. Cl.
*G06F 1/02* (2006.01)
(52) U.S. Cl. .......................... 708/250; 380/46
(58) Field of Classification Search ........... 708/250–256
See application file for complete search history.

(56) References Cited

U.S. PATENT DOCUMENTS

| | | | | |
|---|---|---|---|---|
| 4,755,969 A * | 7/1988 | Pappas | ........................ | 708/252 |
| 5,454,039 A | 9/1995 | Coppersmith et al. | | |
| 5,550,846 A * | 8/1996 | Staiger | ........................ | 708/250 |
| 5,675,652 A | 10/1997 | Coppersmith et al. | | |
| 5,677,952 A | 10/1997 | Blakley, III et al. | | |
| 5,799,088 A | 8/1998 | Raike et al. | | |
| 5,835,597 A | 11/1998 | Coppersmith et al. | | |
| 5,943,248 A * | 8/1999 | Clapp | ........................ | 708/270 |
| 6,014,446 A * | 1/2000 | Finkelstein | ........................ | 708/252 |
| 6,735,606 B2 * | 5/2004 | Terasawa et al. | ........................ | 708/252 |
| 6,826,494 B2 * | 11/2004 | Yamane et al. | ........................ | 702/69 |
| 6,934,388 B1 * | 8/2005 | Clark | ........................ | 708/250 |
| 6,944,253 B2 * | 9/2005 | Ozluturk | ........................ | 375/377 |
| 7,149,240 B2 * | 12/2006 | McDonough et al. | ........................ | 708/250 |
| 7,299,355 B2 * | 11/2007 | Qi | ........................ | 708/252 |
| 7,502,814 B2 * | 3/2009 | Dirscherl et al. | ........................ | 708/250 |
| 7,546,327 B2 * | 6/2009 | Zheng | ........................ | 708/250 |

(Continued)

FOREIGN PATENT DOCUMENTS

| | | |
|---|---|---|
| JP | 7-199808 A | 8/1995 |
| JP | 9-509748 A | 9/1997 |

(Continued)

OTHER PUBLICATIONS

Adrian Perrig et al., CryptoBytes RSA Laboratories, vol. 5, No. 2, Summer/Fall 2002.

(Continued)

*Primary Examiner* — Michael D Yaary
(74) *Attorney, Agent, or Firm* — Birch, Stewart, Kolasch & Birch, LLP

(57) ABSTRACT

A pseudo-random number generator 100 generates a pseudo-random number by the following operation. At C.2, $S1[B4_1]$ is determined from $B4_1$ set in a second internal memory, and $S2[B4_0]$ is determined from $B4_0$. Then, R[J] is generated from $S1[I]$, $S1[B4_1]$, and $S2[B4_0]$. At C.3, $S1[I]$ is newly generated based on $S1[B4_1]$ and $S2[B4_0]$. At C.4, B4 is updated from S2(I). In the above, the relationship between R[J] and S2(I) is cut off, which makes difficult to estimate S2(I) from R[J], and security is increased. Further, since $S1[I]$, $S1[B4_1]$, $S2[B4_0]$, etc. have 4 bytes, the processing speed is high.

7 Claims, 25 Drawing Sheets

U.S. PATENT DOCUMENTS

2001/0012363 A1    8/2001  Smeets
2004/0015527 A1*   1/2004  Sriram et al. ................ 708/250
2004/0220985 A1*  11/2004  Morris ......................... 708/250

FOREIGN PATENT DOCUMENTS

JP            2002-506243 A     2/2002

OTHER PUBLICATIONS

Chapter 17: "Other Stream Ciphers and Real Random-Sequence Generators", (relevant part from Applied Cryptography, Non-patent Document 1 in the Specification), pp. 397-399.

* cited by examiner

Fig. 4

EXPLANATION OF SIGNS

⟨ ⟩ SHOWS 4 BYTES; OTHERS SHOW 1 BYTE

| | LENGTH | REPRESENTATION |
|---|---|---|
| ENCRYPTING KEY K | Keylen BYTES | K[0], K[1], ..., K[Keylen-1] |
| INITIAL VALUE IV | Ivlen BYTES | IV[0], IV[1], ..., IV[Ivlen-1] |
| INTERNAL TABLE S1 | 4 BYTES x 256 ENTRIES = 1024 BYTES | ⟨S1[0]⟩, ⟨S1[1]⟩, ..., ⟨S1[255]⟩ |
| INTERNAL TABLE S2 | 4 BYTES x 256 ENTRIES = 1024 BYTES | ⟨S2[0]⟩, ⟨S2[1]⟩, ..., ⟨S2[255]⟩ |
| STREAM LENGTH | 4 x Strlen BYTES | ⟨R[0]⟩, ⟨R[1]⟩, ..., ⟨R[Strlen-1]⟩ |
| SECOND INTERNAL MEMORY 118 | 4 BYTES | ⟨B4⟩ |
| FIRST INTERNAL MEMORY 117 | 1 BYTE | B1 |

Fig. 5

```
A INITIALIZATION   (INI1, INI2 ARE PREDETERMINED FIXED VALUES)

A.1    I=0
   A.2    <S1[I]>=<INI1[I]>
   A.3    I=I+1
   A.4    IF (I<256) THEN GOTO A.2

A.5    I=0
   A.6    <S2[I]>=<INI2[I]>
   A.7    I=I+1
   A.8    IF (I<256) THEN GOTO A.6

|   | S1 |   |   |
|---|---|---|---|
| 5 | 14 | 90 | 123 |
|   |   |   |   |
| 2001 | 1911 | 511 | 21 |
|   |   |   |   |
| 103 | 901 | 1 | 15 |

|   | S2 |   |   |
|---|---|---|---|
| 8 | 10 | 2001 | 501 |
|   |   |   |   |
| 29 | 4 | 88 | 11 |
|   |   |   |   |
| 2 | 8 | 511 | 9 |

Fig. 9

B KEY SCHEDULING

| | | |
|---|---|---|
| B. 1 | J=0 | |
| B. 2 | I=0 | |
| B. 3 | B1=(B1+K[I%Keylen]) % 256 | |
| B. 4 | Swap(S1[I]$_J$, S1[B1]$_J$) | |
| B. 5 | B1=(B1+IV[I%Ivlen]) % 256 | |
| B. 6 | B1=B1 xor ((S2[I]$_J$+S2[B1]$_J$) % 256) | |
| B. 7 | I=I+1 | |
| B. 8 | IF (I<256) THEN GOTO B. 3 | |
| B. 9 | J=J+1 | |
| B. 10 | IF ( J<4) THEN GOTO B. 2 | |
| | | |
| B. 11 | J=0 | |
| B. 12 | I=0 | |
| B. 13 | B1=(B1+IV[I%Ivlen]) % 256 | |
| B. 14 | Swap(S2[I]$_J$, S2[B1]$_J$) | |
| B. 15 | B1=(B1+K[I%Keylen]) % 256 | |
| B. 16 | B1=B1 xor ((S1[I]$_J$+S1[B1]$_J$) % 256) | |
| B. 17 | I=I+1 | |
| B. 18 | IF (I<256) THEN GOTO B. 13 | |
| B. 19 | J=J+1 | |
| B. 20 | IF ( J<4) THEN GOTO B. 12 | |

Fig. 16

<u>C STREAM GENERATION</u>
ROTL(x, s) SHOWS SHIFTING
32-BIT DATA X ROTATIONALLY TO LEFT BY s BITS
C. 1  I=0, J=0
C. 2  $\langle R[J] \rangle = \langle S1[I] \rangle$ xor $\langle S2[B4_1] \rangle$ xor $\langle S1[B4_1] \rangle$ xor $\langle S2[B4_0] \rangle$
C. 3  $\langle S1[I] \rangle = (\langle S1[I] \rangle + ROTL((\langle S1[B4_1] \rangle$ xor $\langle S2[B4_0] \rangle), 1)) \% 2^{32}$
C. 4  $\langle B4 \rangle = ROTL(((\langle B4 \rangle + \langle S2[I] \rangle) \% 2^{32}), 16)$
C. 5  J=J+1
C. 6  IF (J=Strlen) THEN GOTO END
C. 7  $\langle R[J] \rangle = \langle S2[I] \rangle$ xor $\langle S2[B4_1] \rangle$ xor $\langle S1[B4_0] \rangle$
C. 8  $\langle S2[I] \rangle = (\langle S2[I] \rangle + ROTL((\langle S2[B4_1] \rangle$ xor $\langle S1[B4_0] \rangle), 1)) \% 2^{32}$
C. 9  $\langle B4 \rangle = ROTL(((\langle B4 \rangle + \langle S1[I] \rangle) \% 2^{32}), 16)$
C. 10 J=J+1, I = (I+1) %256
C. 11 IF (J%16384=0) GOTO B. 1
C. 12 IF (J<Strlen) THEN GOTO C. 2
<u>PROCEDURE OF ENCRYPTION</u>
FIRST INITIALIZATION A IS CARRIED OUT, AND THEN KEY SCHEDULING B IS DONE.
THEN STREAM HAVING SAME NUMBER OF WORDS AS PLAINTEXT IS GENERATED
AT STREAM GENERATION C, AND CIPHERTEXT IS MADE BY XORING STREAM AND
PLAINTEXT WORD BY WORD
<u>KEY SCHEDULING IS DONE ONCE AT EVERY GENERATION</u>
<u>OF STREAM HAVING 16384 WORDS (= 65536 BYTES).</u>

Fig. 24

```
EXPLANATION OF SIGNS
ENCRYPTING KEY   Keylen BYTES              K[0], K[1], ..., K[Keylen-1]
INTERNAL TABLE   1 BYTE×256 ENTRIES=256 BYTES   S[0], S[1], ..., S[255]
STREAM           Strlen BYTES              R[0], R[1], ..., R[Strlen-1]
INTERNAL MEMORY  1 BYTE                    B
A INITIALIZATION
  A.1   I=0
  A.2   S[I]=I
  A.3   I=I+1
  A.4   IF (I<256) THEN GOTO A.2
B KEY SCHEDULING
  B.1   I=0, B=0
  B.2   B=(B+S[I]+K[I%Keylen]) % 256        (NOTE) ADDITION WITH 256 AS MODULUS
  B.3   Swap(S[I], S[B])                    (NOTE) Swap MEANS TO SWAP
  B.4   I=I+1
  B.5   IF (I<256) THEN GOTO B.2
C STREAM GENERATION
  C.1   I=0, J=0, B=0
  C.2   I=(I+1) % 256
  C.3   B=(B+S[I]) % 256
  C.4   Swap(S[I], S[B])
  C.5   R[J]=(S[I]+S[B]) % 256
  C.6   J=J+1
  C.7   IF (J<Strlen) THEN GOTO C.2
PROCEDURE OF ENCRYPTION
  FIRST INITIALIZATION A IS CARRIED OUT, AND NEXT KEY SCHEDULING B IS DONE ONLY ONCE.
  THEN STREAM R HAVING SAME NUMBER OF WORDS AS PLAINTEXT IS GENERATED AT C, AND CIPHERTEXT
  IS MADE BY XORING STREAM AND PLAINTEXT BYTE BY BYTE
```

CONVENTIONAL ART

… # PSEUDO RANDOM NUMBER GENERATOR

TECHNICAL FIELD

The present invention relates to a pseudo-random number generator which generates pseudo-random numbers, a pseudo-random number generating method, and a pseudo-random number generating program.

BACKGROUND ART

An RC4 is a representative conventional art as a stream cipher for software. The algorithm of this RC4 has not been officially published. However, currently there exist a number of documents that analyze the RC4, and details of the methods are also published (non-patent document 1, for example).

FIG. 24 shows the algorithm of the RC4. This algorithm consists of "A. Initialization," "B. Key Scheduling," and "C. Stream Generation." In FIG. 24, for example, "%256" in the key scheduling means a residue remained after dividing by 256.

Further, "swap (S[I], S[B])" means swapping of S[I] and S[B].

Further, FIG. 25 illustrates each of "A. Initialization," "B. Key Scheduling," and "C. Stream" shown in FIG. 24.

As shown in FIGS. 24 and 25, this algorithm includes the following:
"A. Initialization": an internal table is generated;
"B. Key Scheduling": swapping is done in data of the generated internal table; and
"C. Stream Generation": pseudo-random numbers are generated using the internal table.

In the conventional art, since the stream generation is carried out by a unit of 1 byte and processing speed is not high, it has been requested to speed up the processing. Further, since the conventional art generates pseudo-random numbers from one internal table, it has been further requested to improve security against decrypting attack.

Non-patent Document 1: Source: Applied Cryptography, Bruce Schneier, John Willey & Sons, ISBN 0-471-11709-9

BRIEF SUMMARY OF THE INVENTION

The present invention aims to provide, in the stream ciphering system, a high-speed pseudo-random number generator, a pseudo-random number generating method, and a pseudo-random number generating program. Further, it is an object to provide a pseudo-random number generator, a pseudo-random number generating method, and a pseudo-random number generating program with higher security in the conventional stream cipher system.

According to the present invention, a pseudo-random number generator generating a pseudo-random number in word unit having a plurality of bytes, includes:
a key memory storing key information;
a first memory S1 configured by a plurality of words and accessing a word S1[I] using an address I (I is an integer at least 0);
a second memory S2 being a memory configured by a same number of plurality of words with the first memory S1 and accessing a word S2[I] using the address I;
an initializing unit setting a value for each of words of the first memory S1 and the second memory S2, and setting an initial value in a first internal memory and a second internal memory;
a key scheduling unit key scheduling values of the words set in the first memory S1 and the second memory S2 using the key information stored in the key memory, and storing in the first memory S1 and the second memory S2; and
a stream generating unit generating a pseudo-random number by alternately using words which have been key scheduled by the key scheduling unit and stored in the first memory S1 and the second memory S2.

The stream generating unit includes:
a first random number generating unit generating an address of the first memory S1 from a value of a word of the first memory S1 and generating a pseudo-random number from the value of the word at the address generated of the first memory S1; and
a second random number generating unit generating an address of the second memory S2 from a value of a word of the second memory S2 and generating a pseudo-random number from the value of the word at the address generated of the second memory S2.

According to the present invention, a pseudo-random number generator generating a pseudo-random number in word unit having a plurality of bytes, includes:
a first memory S1 configured by a plurality of words storing a value key scheduled and accessing a word S1[I] using an address I (I is an integer at least 0);
a second memory S2 being a memory configured by a same number of plurality of words with the first memory S1, composed of a plurality of words storing the value key scheduled, and accessing a word S2[I] using the address I; and
a stream generating unit generating a pseudo-random number by alternately using words stored in the first memory S1 and the second memory S2.

According to the present invention, a pseudo-random number generator generating a pseudo-random number in word unit having n bytes ($1 \leq n \leq N$, N is an integer at least 1), includes:
a stream length memory storing a stream length L of a random number to be generated;
a fixed value memory storing a fixed value;
a key memory storing key information;
an initial value memory inputting and storing an initial value;
a first memory S1 being a memory configured by 256 words and accessing a word S1[I] using an address I (I is an integer of 0-255);
a second memory S2 being a memory configured by a same number of plurality of words with the first memory S1 and accessing a word S2[I] using the address I;
a first internal memory storing a value which is the address I;
a second internal memory storing a value in word unit;
a key scheduling unit updating the value I of the first internal memory using the key information stored in the key memory and the initial value stored in the initial value memory, setting a value of the first internal memory as the address I, swapping a value of n-th byte of each word from an initial word to a final word of the first memory S1 with a value of n-th byte of a word S1[I] at the address I of the first memory S1, further setting a value of the first internal memory as the address I, swapping a value of n-th byte of each word from an initial word to a final word of the second memory S2 with a value of n-th byte of a word S2[I] at the address I of the second memory S2, repeating swapping from a first byte to a N-th byte, and key scheduling words stored in the first memory S1 and the second memory S2; and
a stream generating unit generating a pseudo-random number by alternately using words which have been key scheduled by the key scheduling unit and stored in the first memory S1 and the second memory S2.

According to the present invention, a pseudo-random number generator generating a pseudo-random number in word unit having n bytes ($1 \leq n \leq N$, N is an integer at least 1), includes:

a stream length memory storing a stream length L of a random number to be generated;

a fixed value memory storing a fixed value;

a key memory storing key information;

an initial value memory inputting and storing an initial value;

a first memory S1 being a memory configured by 256 words and accessing a word S1[I] using an address I (I is an integer of 0-255);

a second memory S2 being a memory configured by a same number of plurality of words with the first memory S1 and accessing a word S2[I] using the address I;

a first internal memory storing a value which is the address I;

a second internal memory storing a value in word unit;

an initializing unit setting a value for each of words of the first memory S1 and the second memory S2 using a fixed value stored in the fixed value memory and setting an initial value in the first internal memory and the second internal memory;

a key scheduling unit updating the value I of the first internal memory using the key information stored in the key memory and the initial value stored in the initial value memory, setting a value of the first internal memory as the address I, swapping a value of n-th byte of each word from an initial word to a final word of the first memory S1 with a value of n-th byte of a word S1[I] at the address I of the first memory S1, further setting a value of the first internal memory as the address I, swapping a value of n-th byte of each word from an initial word to a final word of the second memory S2 with a value of n-th byte of a word S2[I] at the address I of the second memory S2, repeating swapping from a first byte to a N-th byte, and key scheduling words stored in the first memory S1 and the second memory S2; and a first random number generating unit generating values of addresses I2 and I3 from lower 2 bytes of the word stored in the second internal memory, generating a pseudo-random number R1 using a value of each word S1[I1] from the initial word to the final word of the first memory S1, a value of a word S1[I2] at the address I2 of the first memory S1, a value of a word S2[I3] at the address I3 of the second memory S2, and outputting to a buffer memory;

a first state changing unit computing and shifting the value of the word S1[I2] at the address I2 of the first memory S1 and the value of the word S2[I3] at the address I3 of the second memory S2, and rewriting a value of the word S1[I1] at the address I1 of the first memory S1 using a value shifted, a first exchanging unit exchanging a value of an upper digit and a value of a lower digit of the word stored in the second internal memory;

a second random number generating unit generating values of addresses I4 and I5 from lower 2 bytes of the word stored in the second internal memory, generating a pseudo-random number R2 using a value of each word S2[I1] from the initial word to the final word of the second memory S2, a value of a word S2[I4] at the address I4 of the second memory S2, a value of a word S1[I5] at the address I5 of the first memory S1, and outputting;

a second state changing unit computing and shifting a value of the word S2[I4] at the address I4 of the second memory S2 and a value of the word S1[I5] at the address I5 of the first memory S1, and rewriting a value of a word S2[I1] at the address I1 of the second memory S2 using a value shifted, a second exchanging unit exchanging a value of an upper digit and a value of a lower digit of the word stored in the second internal memory;

a looping unit repeating operations of the first random number generating unit, the first state changing unit, and the first exchanging unit, and operations of the second random number generating unit, the second state changing unit, and the second exchanging unit until the stream length becomes the stream length stored in the stream length memory;

a buffer memory inputting and temporarily storing the pseudo-random number R1 output from the first random number generating unit and the pseudo-random number R2 output from the second random number generating unit and outputting as a pseudo-random number stream, and a rescheduling unit causing the key scheduling unit to operate when the stream length of the pseudo-random number output to the buffer memory becomes a predetermined rescheduling length.

According to the present invention, a pseudo-random number generating method to be implemented by a pseudo-random number generator, being a computer having a key memory storing key information, a first memory S1 configured by a plurality of words and accessing a word S1[I] using an address I (I is an integer at least 0), and a second memory S2 being a memory configured by a same number of plurality of words with the first memory S1 and accessing a word S2[I] using the address I, and generating a pseudo-random number in word unit having a plurality of bytes, the method includes:

setting a value for each of words of the first memory S1 and the second memory S2, and setting an initial value in a first internal memory and a second internal memory by an initializing unit;

key scheduling values of the words set in the first memory S1 and the second memory S2 using the key information stored in the key memory, and storing in the first memory S1 and the second memory S2 by a key scheduling unit; and generating a pseudo-random number by alternately using words which have been key scheduled and stored in the first memory S1 and the second memory S2 by a stream generating unit.

According to the present invention, a pseudo-random number generating program causes a pseudo-random number generator, being a computer having a key memory storing key information, a first memory S1 configured by a plurality of words and accessing a word S1[I] using an address I (I is an integer at least 0), and a second memory S2 being a memory configured by a same number of plurality of words with the first memory S1 and accessing a word S2[I] using the address I, and generating a pseudo-random number in word unit having a plurality of bytes, to implement processes of:

(1) setting a value for each of words of the first memory S1 and the second memory S2, and setting an initial value in a first internal memory and a second internal memory;

(2) key scheduling values of the words set in the first memory S1 and the second memory S2 using the key information stored in the key memory, and storing in the first memory S1 and the second memory S2; and (3) generating a pseudo-random number by alternately using words which have been key scheduled and stored in the first memory S1 and the second memory S2.

BRIEF DESCRIPTION OF THE DRAWINGS

FIG. 4 explains signs used for explaining an operation of the pseudo-random number generator 100 according to the first embodiment.

FIG. 5 shows a program for carrying out initialization by an initializing unit 120.

FIG. 8 shows a concrete example of the values of words of the first memory S1 (115) and the second memory S2 (116) set by the initializing unit 120.

FIG. 9 shows a program for carrying out key scheduling by a key scheduling unit 130.

FIG. 16 shows a program for carrying out stream generation by a stream generating unit 140.

FIG. 24 explains a conventional art.

EXPLANATION OF SIGNS

100: a pseudo-random number generator; 110: a memory unit; 111: a stream length memory; 112: a fixed value memory; 113: a key memory; 114: an initial value memory; 115: a first memory S1; 116: a second memory S2; 117: a first internal memory; 118: a second internal memory; 120: an initializing unit; 130: a key scheduling unit; 140: a stream generating unit; 141: a first random number generating unit; 142: a first state changing unit; 143: a first exchanging unit; 144: a second random number generating unit; 145: a second state changing unit; 146: a second exchanging unit; 147: a looping unit; 148: a buffer memory; 149: a rescheduling unit; 810: a CPU; 811: a ROM; 812: a RAM; 813: a liquid crystal display unit; 814: a keyboard; 815: a mouse; 816: a communication board; 817: an FDD; 818: a CDD; 819: a printer; 820: a magnetic disk drive; 821: an OS; 822: a window system; 823: a group of programs; 824: a memory area; 825: a bus; 830: a system unit; 840: the Internet; and 850: a Web server.

DETAILED DESCRIPTION OF THE INVENTION

The present invention enables to generate high security pseudo-random numbers with a high speed operation in the stream cipher system.

Embodiment 1

The first embodiment will be explained by referring to FIGS. 1 through 23. The first embodiment relates to a pseudo-random number generator, a pseudo-random number generating method, and a pseudo-random number generating program using two internal tables.

Figure 1:
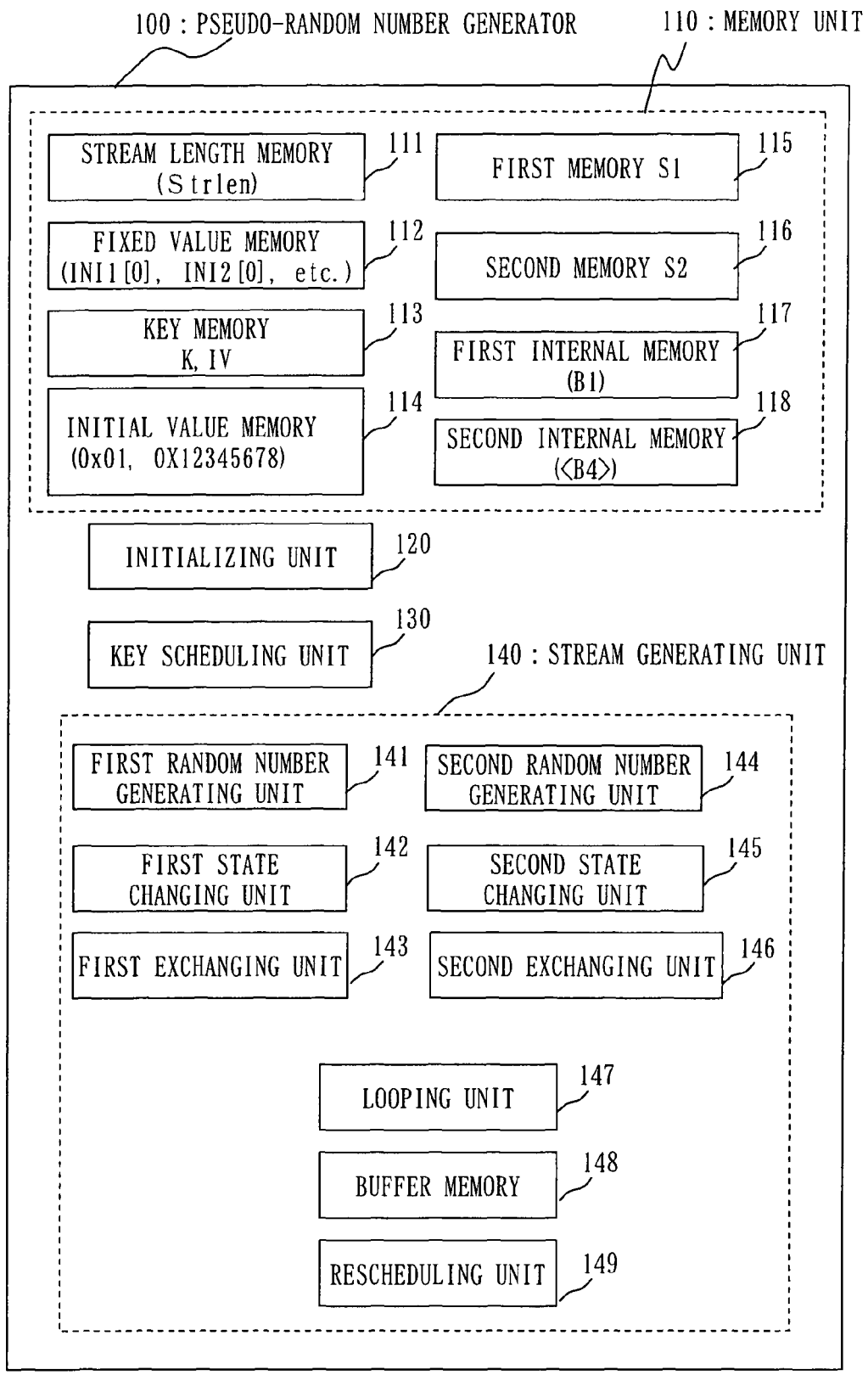
FIG. 1 shows a configuration of a pseudo-random number generator 100 according to the first embodiment.

FIG. 1 is a block diagram showing a pseudo-random number generator 100 according to the first embodiment. The pseudo-random number generator 100 includes a memory 110 having various memories, an initializing unit 120, a key scheduling unit 130, and a stream generating unit 140.

The memory unit 110 includes:

(1) a stream length memory 111 storing a stream length of a random number to be generated;

(2) a fixed value memory 112 storing a fixed value (INI 1[0], etc. described later);

(3) a key memory 113 storing key information (K[0], etc. described later);

(4) an initial value memory 114 inputting and storing an initial value (0x01, 0x12345678 described later), where initial values of 0x01 and 0x12345678 are merely examples, and initial values are not limited to these values. Any value with 1 byte can be 0x01, and any value with 4 bytes can be 0x12345678.

(5) a first memory S1 (115) which is a memory configured by 256 words and accesses a word S1[I] using an address I (I is an integer of 0-255);

(6) a second memory S2 (116) which is a memory configured by the same number of words with the first memory S1 (115) and accesses a word S2[I] using the address I;

(7) a first internal memory 117 (B1, described later) storing a value which is the address I;

(8) a second internal memory 118 (<B4>, described later) storing a value in word unit; and so on. These memories can be implemented by a cache memory, a flush memory, a random access memory, a fixed disk, an optical disk.

The initializing unit 120 sets a value for each of words of the first memory S1 (115) and the second memory S2 (116) using fixed values stored in the fixed value memory 112, and also sets initial values in the first internal memory 117 and the second internal memory 118. Detailed operation of the initializing unit 120 will be explained later using FIGS. 5 through 8.

Using the key information stored by the key memory 113, the key scheduling unit 130 key schedules values of words set in the first memory S1 (115) and the second memory S2 (116) and stores in the first memory S1 (115) and the second memory S2 (116). Detailed operation of the key scheduling unit 130 will be explained later using FIGS. 9 through 15.

The stream generating unit 140 generates a pseudo-random number using the words stored in the first memory S1 (115) and the second memory S2 (116). The stream generating unit 140 includes a first random number generating unit 141, a first state changing unit 142, a first exchanging unit 143, a second random number generating unit 144, a second state changing unit 145, a second exchanging unit 146, a looping unit 147, a buffer memory 148, and a rescheduling unit 149. Detailed operations of these constitutional components will be explained later using FIGS. 16 through 21.

Figure 2:
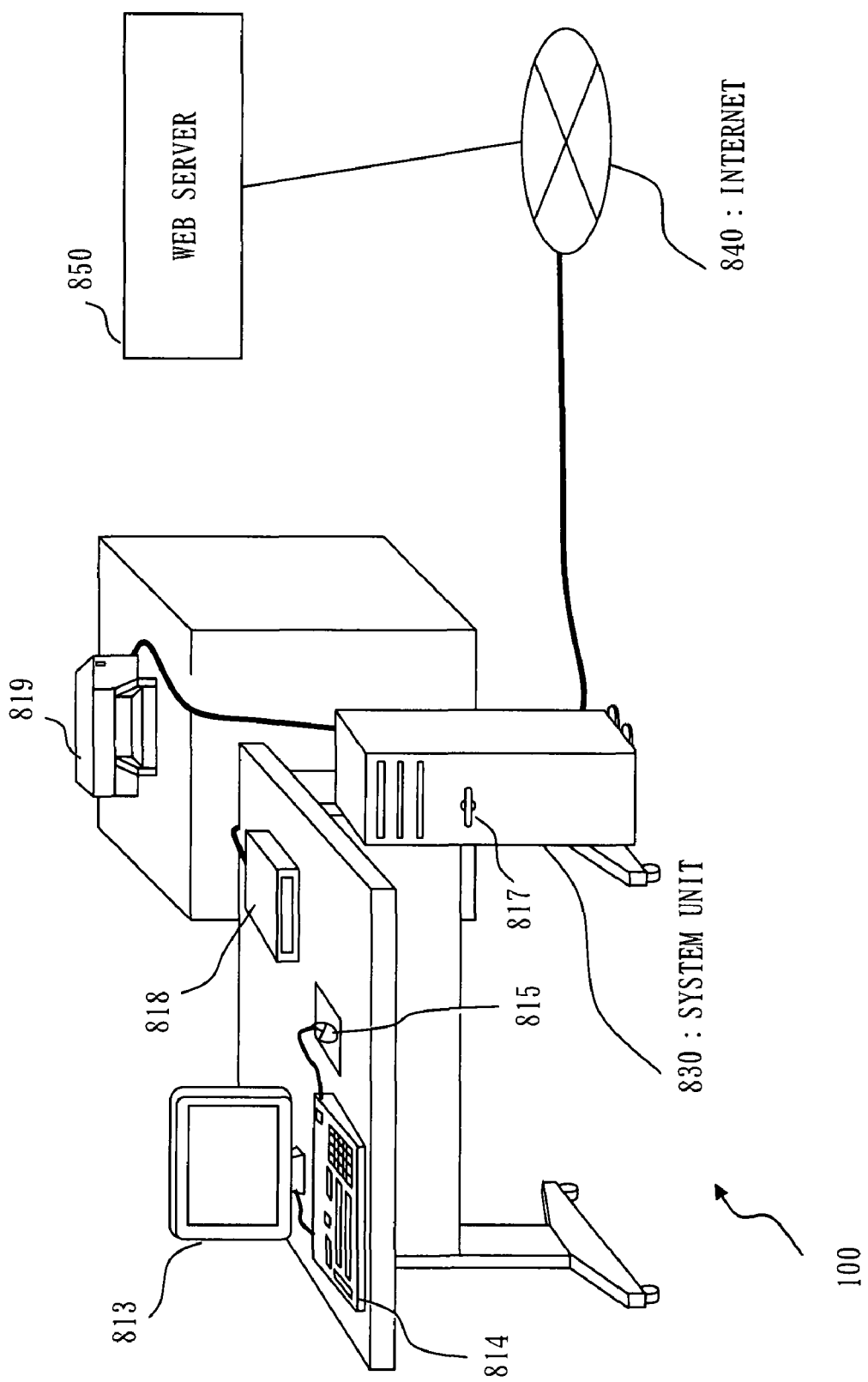
FIG. 2 shows an example of an exterior of the pseudo-random number generator 100 according to the first embodiment.

FIG. 2 shows an exterior of the pseudo-random number generator 100 according to the first embodiment. In FIG. 2, the pseudo-random number generator 100 includes a system unit 830, a liquid crystal display unit 813, a keyboard 814, a mouse 815, a compact disk drive (CDD) 818, and a printer 819, and these are connected by a cable. Further, the pseudo-random number generator 100 is connected to the Internet 840, and is able to communicate with a Web server 850 using a cipher of pseudo-random number.

Figure 3:
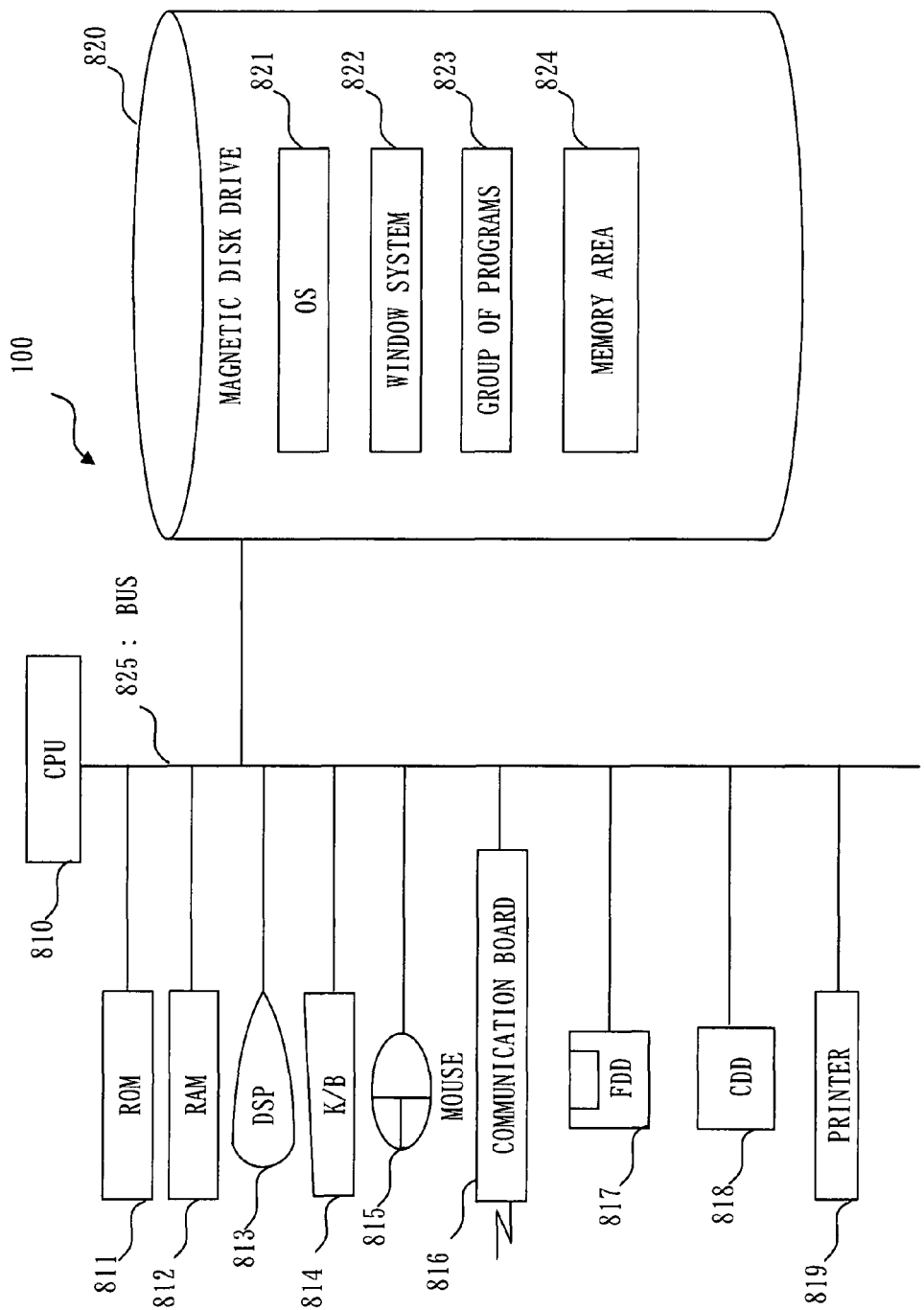
FIG. 3 shows a hardware configuration of the pseudo-random number generator 100 according to the first embodiment.

FIG. 3 is a hardware configuration of the pseudo-random number generator 100 according to the first embodiment. In FIG. 3, the pseudo-random number generator 100 includes a CPU (Central Processing Unit) 810 executing programs. The CPU 810 is connected to a ROM 811, a RAM 812, the liquid crystal display unit 813, the keyboard 814, the mouse 815, the communication board 816, an FDD (Flexible Disk Drive) 817, a CDD 818, a printer 819, and a magnetic disk drive 820 via a bus 825. The RAM 812 is an example of a volatile memory. The RAM 812 is an example of the buffer memory 148, for example. The ROM 811, the FDD 817, the CDD 818, and the magnetic disk drive 820 are examples of nonvolatile memories. These are examples of the memory unit 110.

The pseudo-random number generator 100 is connected to the Internet 840 via the communication board 816. Further, the communication board 816, the keyboard 814, and the FDD 817 are examples of a data inputting unit. Further, for example, the communication board 816, the liquid crystal display unit 813, and the magnetic disk drive 820 are examples of an outputting unit.

The magnetic disk drive 820 stores an operating system (OS) 821, a window system 822, and a group of programs 823. Further, to a memory area 824 of the magnetic disk drive 820, various memories of the memory unit 110 shown in FIG. 1 correspond. The group of programs 823 is executed by the CPU 810, the OS 821; and the window system 822.

Programs for implementing functions explained by "some unit" in FIG. 1 are stored in the group of programs 823. For example, the group of programs 823 stores programs for implementing functions of the initializing unit 120, the key scheduling unit 130, and the stream generating unit 140 shown in FIG. 1. The programs are read and executed by the CPU 810.

Moreover, "some unit" explained in FIG. 1 is implemented or processed by the CPU 810, or can be embodied by the firmware stored in the ROM 811. In another way, it can be implemented only by software, only by hardware, or a combination of software and hardware, or further a combination with firmware.

Further, programs which implements the following embodiments can be also stored in other recording medium such as a magnetic disk drive 820, a FD (Flexible Disk), an optical disk, a CD (Compact Disk), an MD (Mini Disk), a DVD (Digital Versatile Disk), etc.

Next, an operation for generating pseudo-random number by the pseudo-random number generator 100 will be explained by referring to FIGS. 4 through 23. The operation of the pseudo-random number generator 100 includes "A. Initialization", "B. Key scheduling", and "C. Stream generation". First, signs used in the following will be explained using FIG. 4 before discussing these operations.

(1) Encrypting key K (an example of key information):
The encrypting key K is stored in a key memory 113. The encrypting key K has length of "Keylen" (byte). It is expressed as K[0]-K[Keylen-1] in 1 byte unit.

(2) Initial value IV (an example of key information):
The initial value IV is stored in the key memory 113. The initial value IV has length of "IVlen" (byte). It is expressed as IV[0]-IV[IVlen-1] in 1 byte unit.

(3) Internal table S1 (the first memory S1 (115)):
The internal table S1 is implemented by words stored in the first memory S1 (115). In the following, the first memory S1 (115) may be used in the same meaning as the internal table S1. The internal table S1 has 4 bytes×256 entries=1024 bytes. It can be expressed as <S1[0]>-<S1[255]> in 4 bytes unit.

Here, the expression using "< >" in <S1[0]> means that S1[0] has 1 word (4 bytes). Here, 1 word is not limited to 4 bytes, but can be 2 bytes, 6 bytes, 8 bytes, etc.

(4) Internal table S2 (the second memory S2 (116)):
The internal table S2, as well as the internal table S1, has 4 bytes×256 entries=1024 bytes. The internal table S2 is implemented by the second memory S2 (116). In the following, as well as the internal table S1, the second memory S2 (116) may be used in the same meaning as the internal table S2. It is expressed as <S2[0]>-<S2[255]> in 4 bytes unit.

(5) Stream length of random numbers:
The stream length of random numbers to be generated is expressed as "4×Strlen". It can be expressed as <R[0]>-<R[Strlen-1]> in 4 bytes unit. The stream length is stored in a stream length memory 111.

(6) Second internal memory 118:
The second internal memory 118 stores values of 4 bytes. The second internal memory 118 is sometimes expressed as <B4>.

(7) First internal memory 117:
The first internal memory 117 stores values of 1 byte. The first internal memory 117 is sometimes expressed as "B1".

In the following operating expressions and substituting expressions, a variable in the right-hand side means that the CPU 80 reads a value from the memory (the memory unit 110); a variable in the left-hand side means that the CPU 80 writes a value in the memory (the memory unit 110). Further, operations such as "store", "update", "generate", "become", "set", and "swap" mean that the CPU 80 writes a value in the memory (the memory unit 110).

Figure 6:
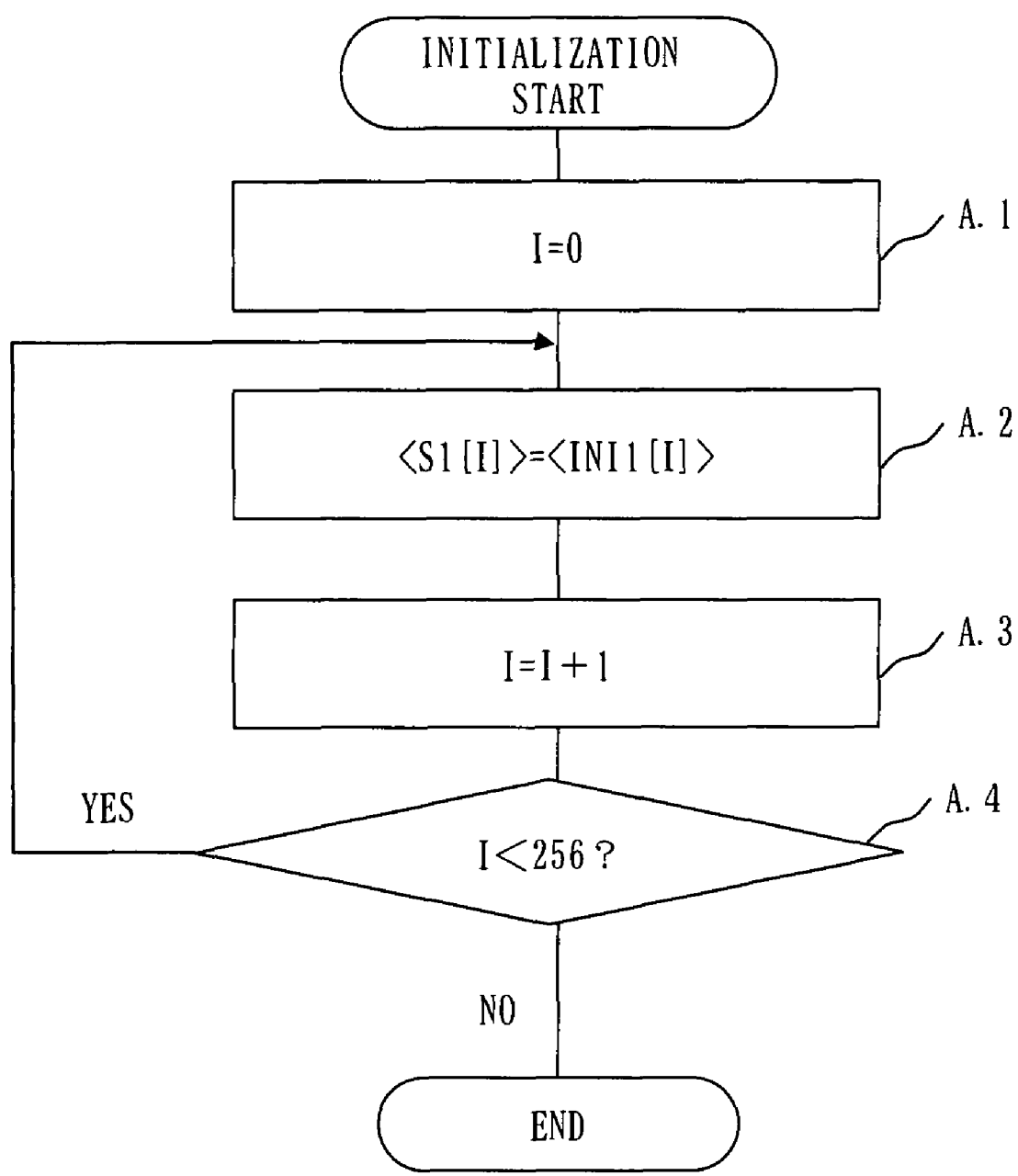
FIG. 6 shows a flowchart of FIG. 5.
Figure 7:
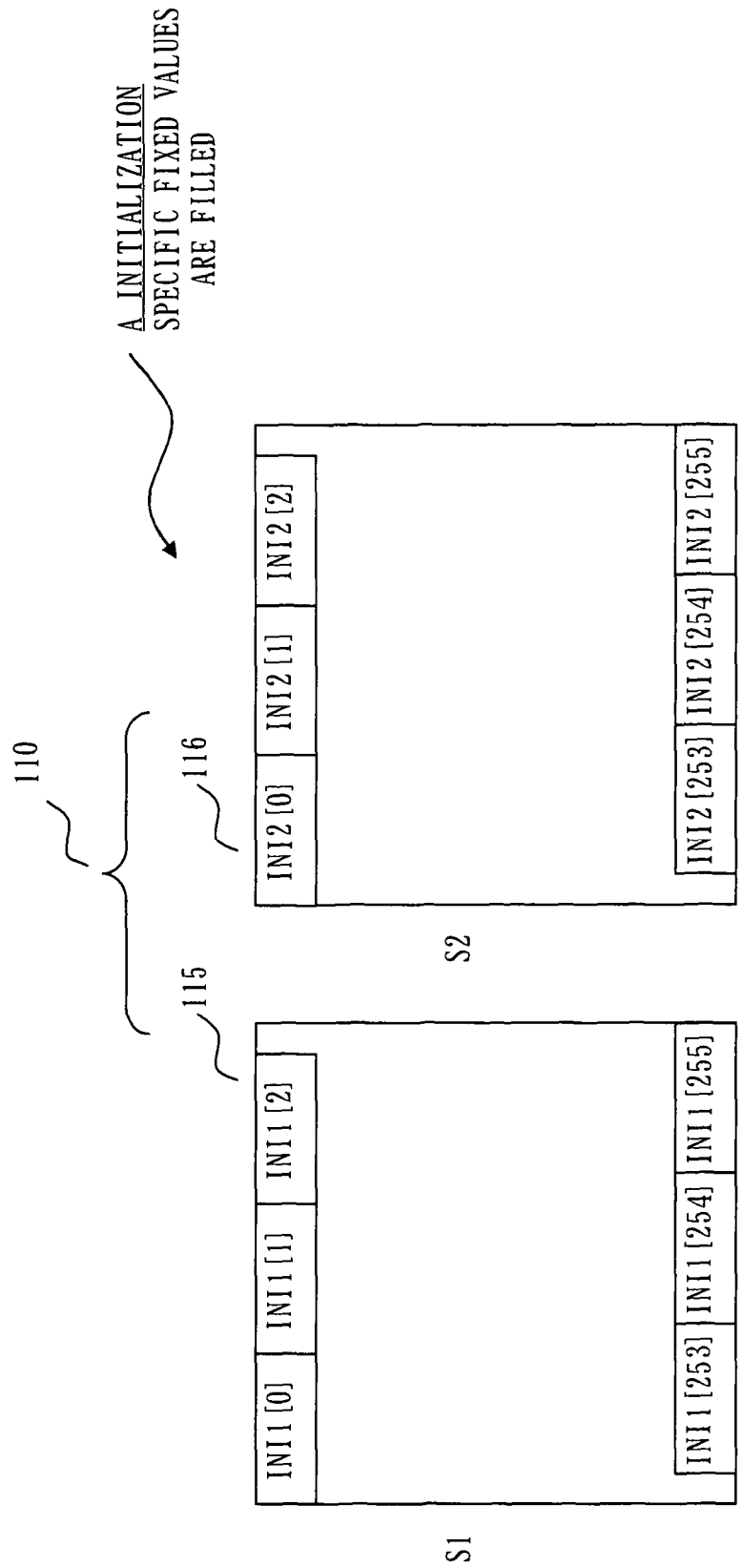
FIG. 7 shows that the initializing unit 120 sets values of words in a first memory S1 (115) and a second memory S2 (116).

(A. Initialization: (S101))
Next, the initialization will be explained using FIGS. 5 through 8. "Initialization" is a process to generate the internal table S1 and the internal table S2. This "initialization" corresponds to S101 in FIG. 22 which will be discussed later. FIG. 5 shows a program for carrying out the initialization. Further, FIG. 6 is a flowchart showing A.1 through A.4 in FIG. 5. Here, A.5 through A.8 are omitted, since they are the same as A.1 through A.4. FIG. 7 shows initializing the internal table S1 (the first memory S1 (115)) and the internal table S2 (the second memory S2 (116)). FIG. 8 explains the status of FIG. 7 using concrete numbers.

(1) An initializing unit 120 sets a value for each of words in the first memory S1 (115) using fixed values <INI1[0]>, etc. stored in the fixed value memory 112 at steps A.1 through A.4 in FIG. 6. Similarly, the initializing unit 120 sets a value for each of words in the second memory S2 (116) using fixed values <INI2[0]>, etc. stored in the fixed value memory 112 at steps A.5 through A.8. FIG. 7 shows the status in which the initializing unit 120 has set values for the words in the first memory S1 (115) and the second memory S2 (116). FIG. 7 shows the status in which the initializing unit 120 has set values for the words in the first memory S1 (115) using fixed values <INI1[0]>-<INI1[255]> of 4 bytes stored in the fixed value memory 112, and the initializing unit 120 has set values for the words in the second memory S2 (116) using fixed values <INI2[0]>-<INI2[255]> of 4 bytes stored in the fixed value memory 112. <INI1[0]>, etc. show fixed values of 4 bytes as described above, and more concretely, values shown in FIG. 8 are set, for example.

(2) Further, the initializing unit 120 sets initial values in "B1" which is the first internal memory 117 and <B4> which is the second internal memory 118. These initial values are stored in the initial value memory 114. At A.9 and A.10 in FIG. 5, for example, the initializing unit 120 sets initial values "0x01" in "B1" and "0x12345678" in <B4>.

(B. Key scheduling: (S102))

Next, the key scheduling implemented by the key scheduling unit 130 will be explained using FIGS. 9 through 15. This "key scheduling" corresponds to S102 in FIG. 22 which will be discussed later. "Key scheduling" is a process to scramble the contents of the internal table using the key information. In this embodiment, as an example of "key scheduling", a case will be explained in which the contents of the internal table S1 and the internal table S2 generated by the initialization are scrambled using the encrypting key K and the initial value IV as key information.

FIG. 9 shows a program implemented by the key scheduling unit 130.

Figure 10:
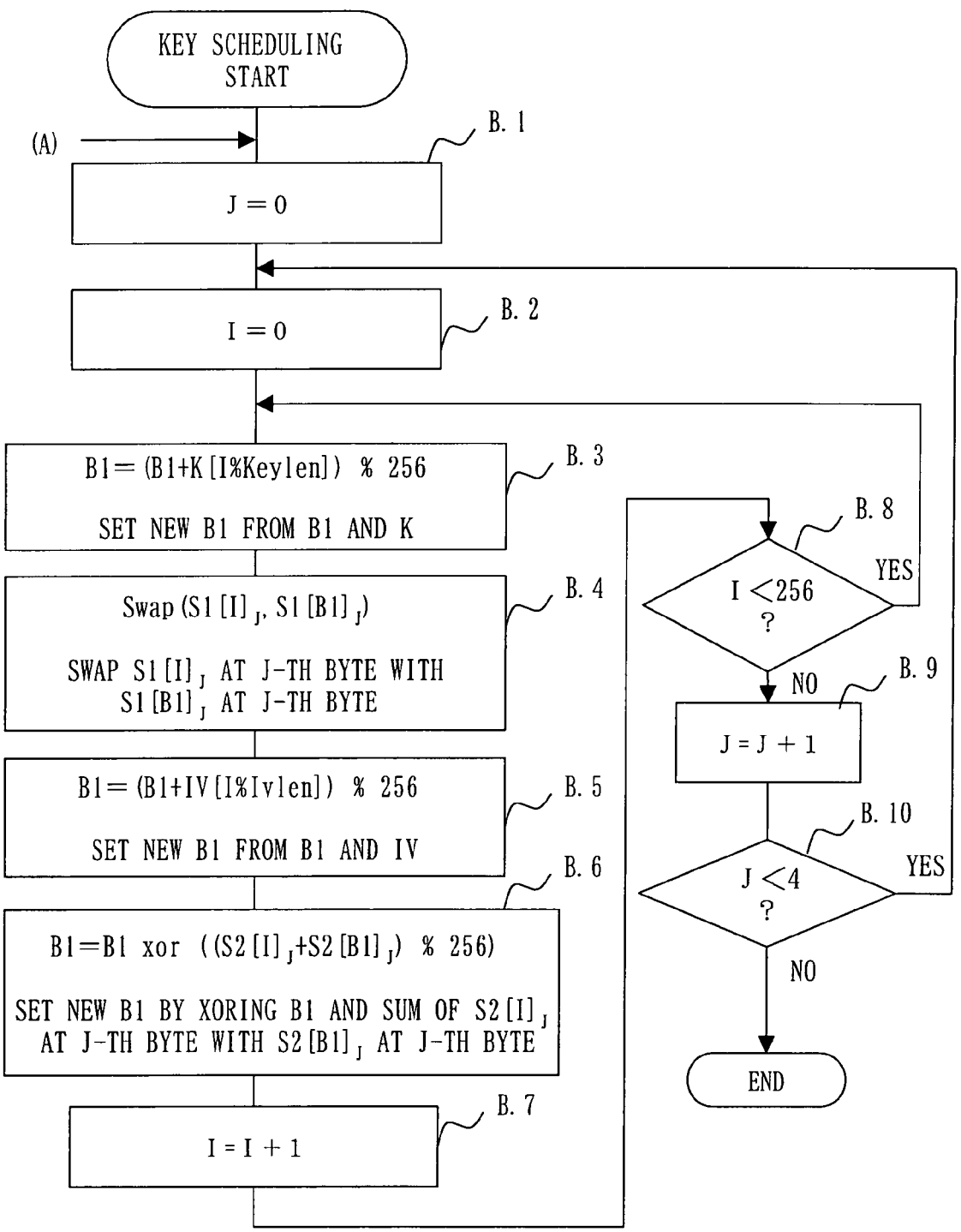
FIG. 10 is a flowchart showing B.1 through B.10 of FIG. 9.

FIG. 10 is a flowchart showing B.1 through B.10 of FIG. 9.

Figure 11:
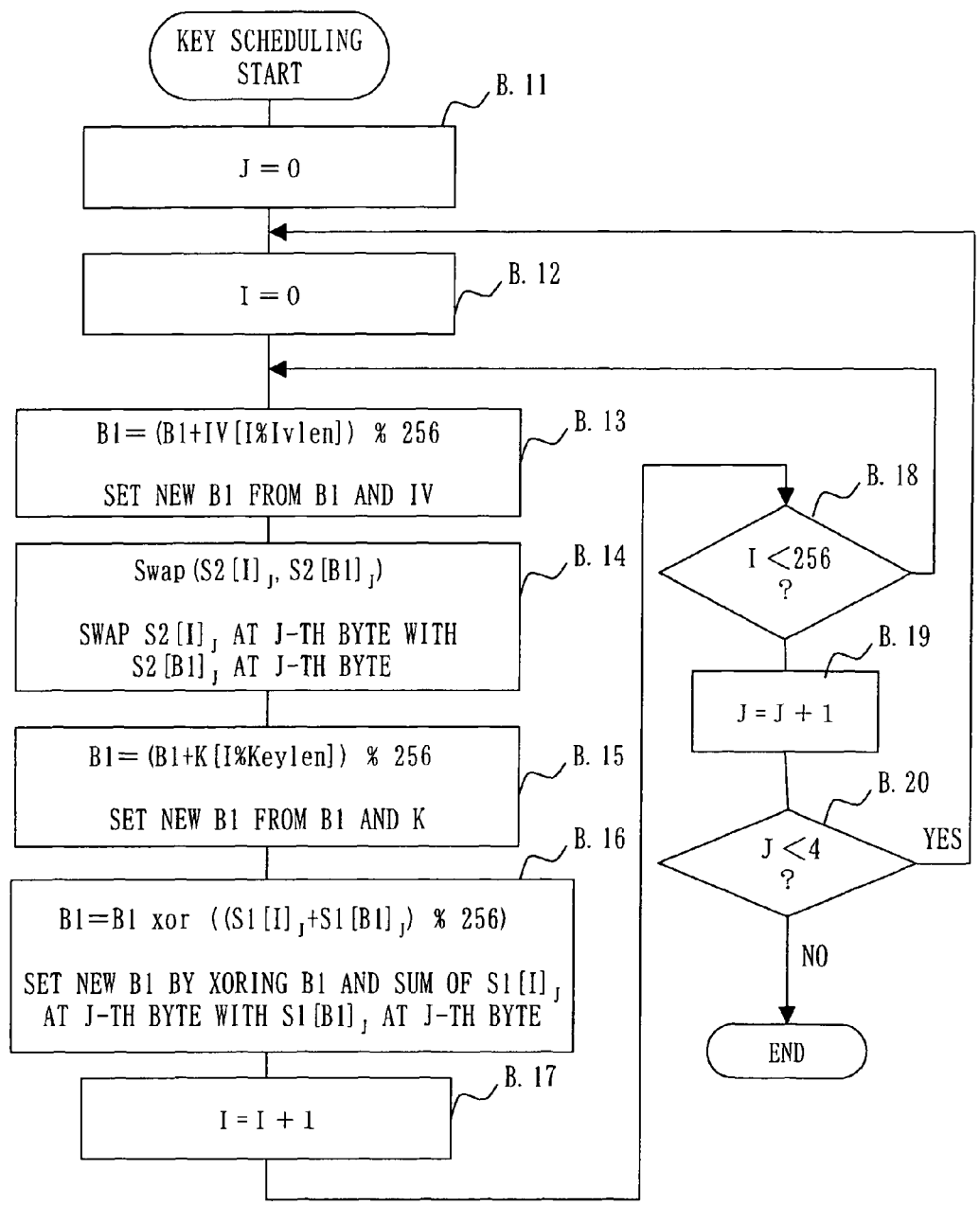
FIG. 11 is a flowchart showing B.11 through B.20 of FIG. 9.

FIG. 11 is a flowchart showing B.11 through B.20 of FIG. 9.

Figure 12:
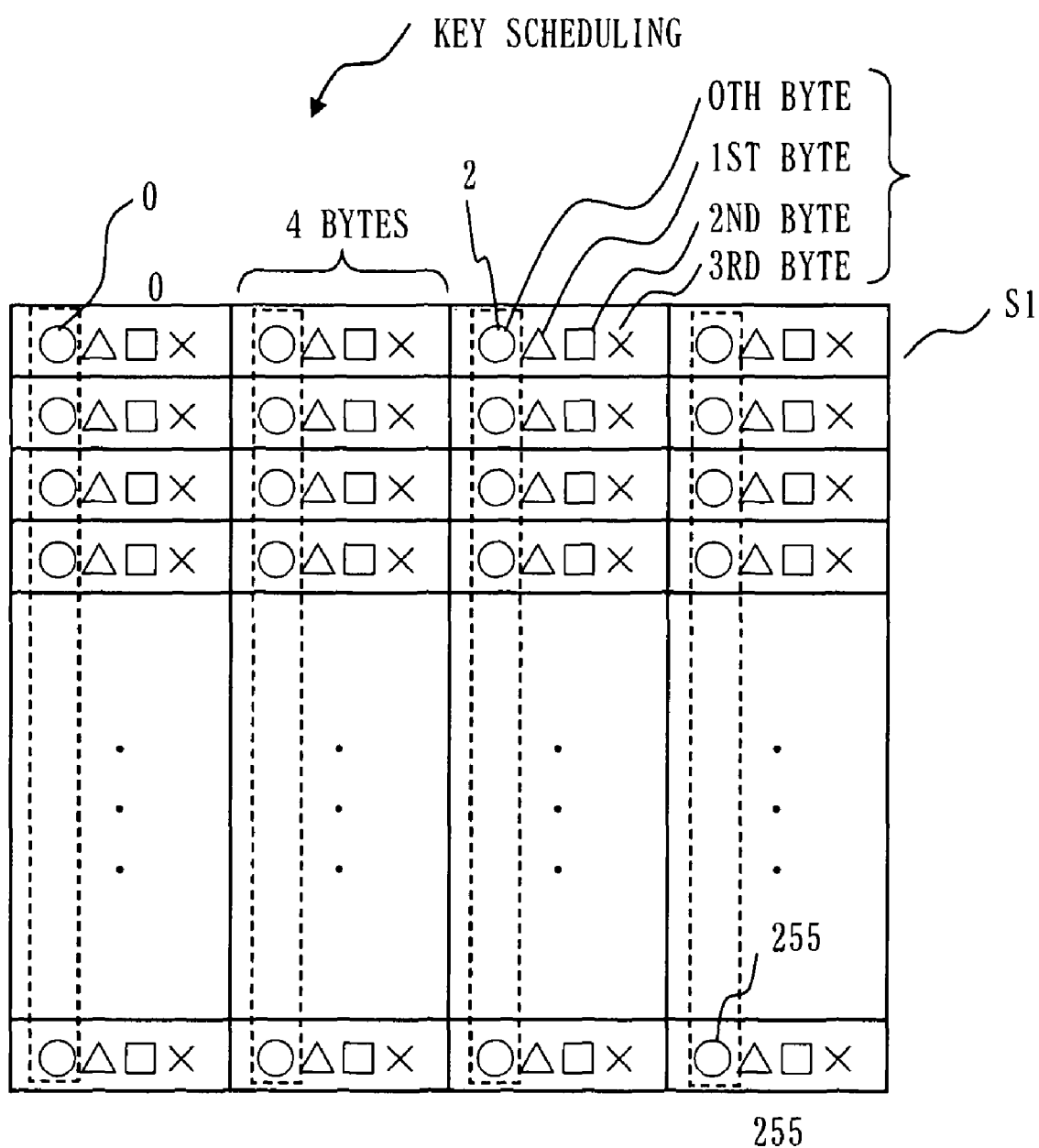
FIG. 12 explains an outline of the key scheduling.

FIG. 12 explains an outline of the key scheduling. FIG. 12 will be explained. FIG. 12 shows the internal table S1. A set of "circle, triangle, square, and cross" shows a word of 4 bytes. Further, each of "circle", "triangle", "square", and "cross" shows 1 byte. Among "circle, triangle, square, and cross" in a set, "circle" is referred to as $0^{th}$ byte;
"triangle" is referred to as $1^{st}$ byte;
"square" is referred to as $2^{nd}$ byte; and
"cross" is referred to as $3^{rd}$ byte, for example.

In this key scheduling, the key scheduling unit 130 implements the following processes:

(1) First, all "circles" which are $0^{th}$ bytes (J=0) are swapped. "Circle" of $0^{th}$ byte is set as "circle 0", and "circle" of $0^{th}$ byte of an address B1 is set as a predetermined "circle". Predetermined "circles" which are object for swapping are determined by a value of "B1" such as B.3, B.5, B.6, etc.

That is, "circle 0" is swapped with the predetermined "circle" (B.4);
(2) next, "circle 1" is swapped with the predetermined "circle" (B.4); and
(3) then "circle 2" is swapped with the predetermined "circle" (B.4).
(4) Subsequently, the above processes will be carried out sequentially to "circle 255". Predetermined "circles" which are object for swapping are determined by a value of "B1" such as B.3, B.5, B.6, etc.
(5) Then, after the processes for J=0 which shows "circle" are finished up to "circle 255" (I=255), the same processes will be carried out for a case of J=1, namely, all "triangles" of the $1^{st}$ byte. Subsequently, similar processes will be carried out for "squares" (J=2) and "crosses" (J=3).
(6) The key scheduling unit 130 implements the same processes for the internal table S2 as ones for the internal table S1 (B.11 through B.20).

Figure 13:
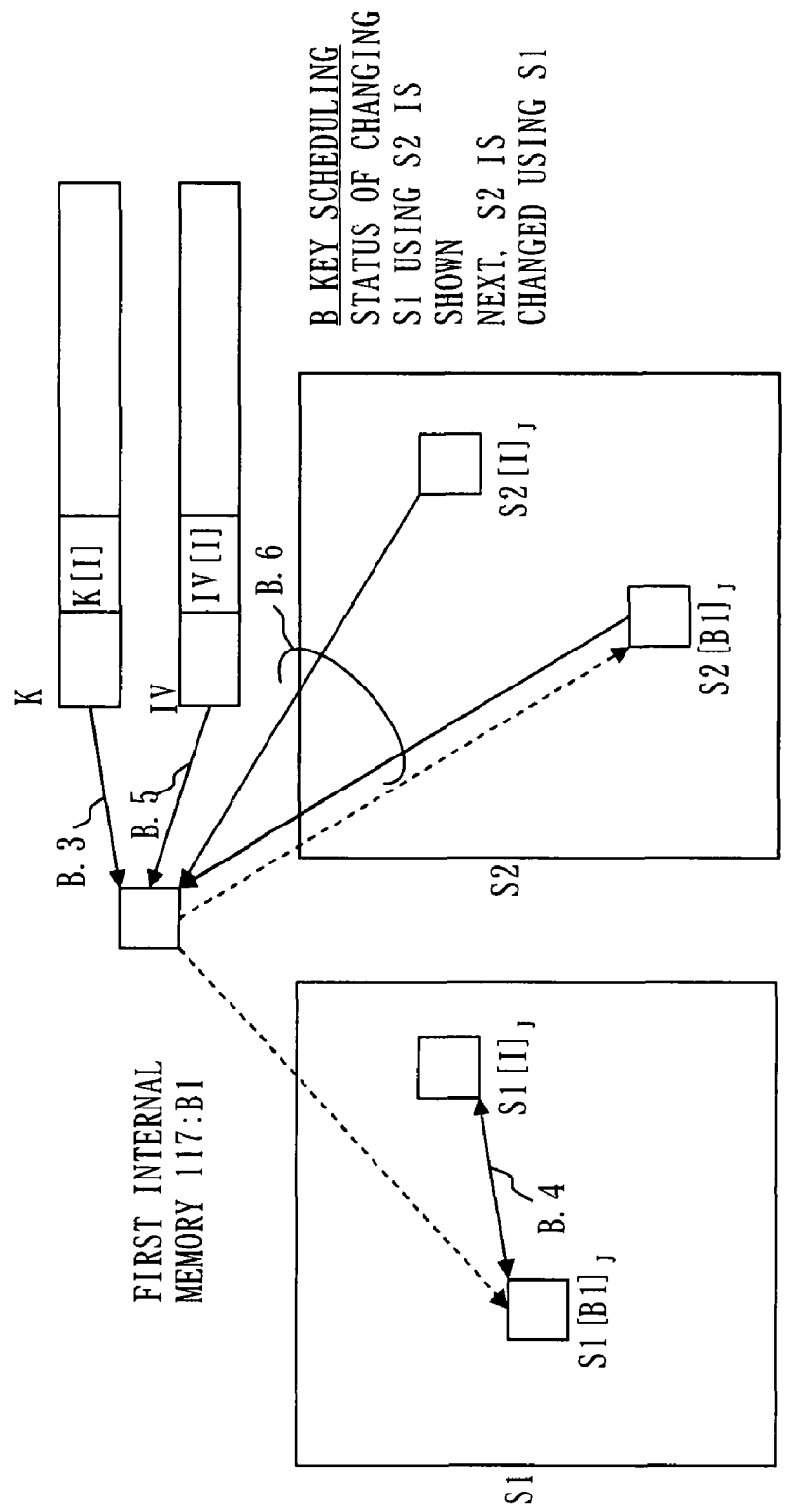
FIG. 13 illustrates B.3 through B.6 of FIG. 10.

FIG. 13 illustrates steps B.3 through B.6 in FIG. 9. Next, FIG. 13 will be explained. As has been described, the key scheduling is a process implemented by the key scheduling unit 130.

(1) At B.3, an address is set at "B1" which is the first internal memory 117 based on the encrypting key K (an example of the key information).
(2) At B.4, S1[B1], is determined from the address "B1" which has been set. Here, S1[B1]$_J$ shows J-th (J=0, 1, 2, or 3) byte of <S1[B1]> having 4 bytes as discussed above. At B4, S1[I]$_J$ is replaced (swapped) with S1[B1]$_J$. Here, I is an integer of 0-255.
(3) At B.5, an address is set in "B1" (the first internal memory 117) based on the initial value IV (an example of the key information).
(4) At B.6, S2[B1]$_J$ is determined from "B1" which is set at B.5, and an address is set in "B1" which is the first internal memory 117 based on S2[B1]$_J$ and S2[I]$_J$.

Figure 14:
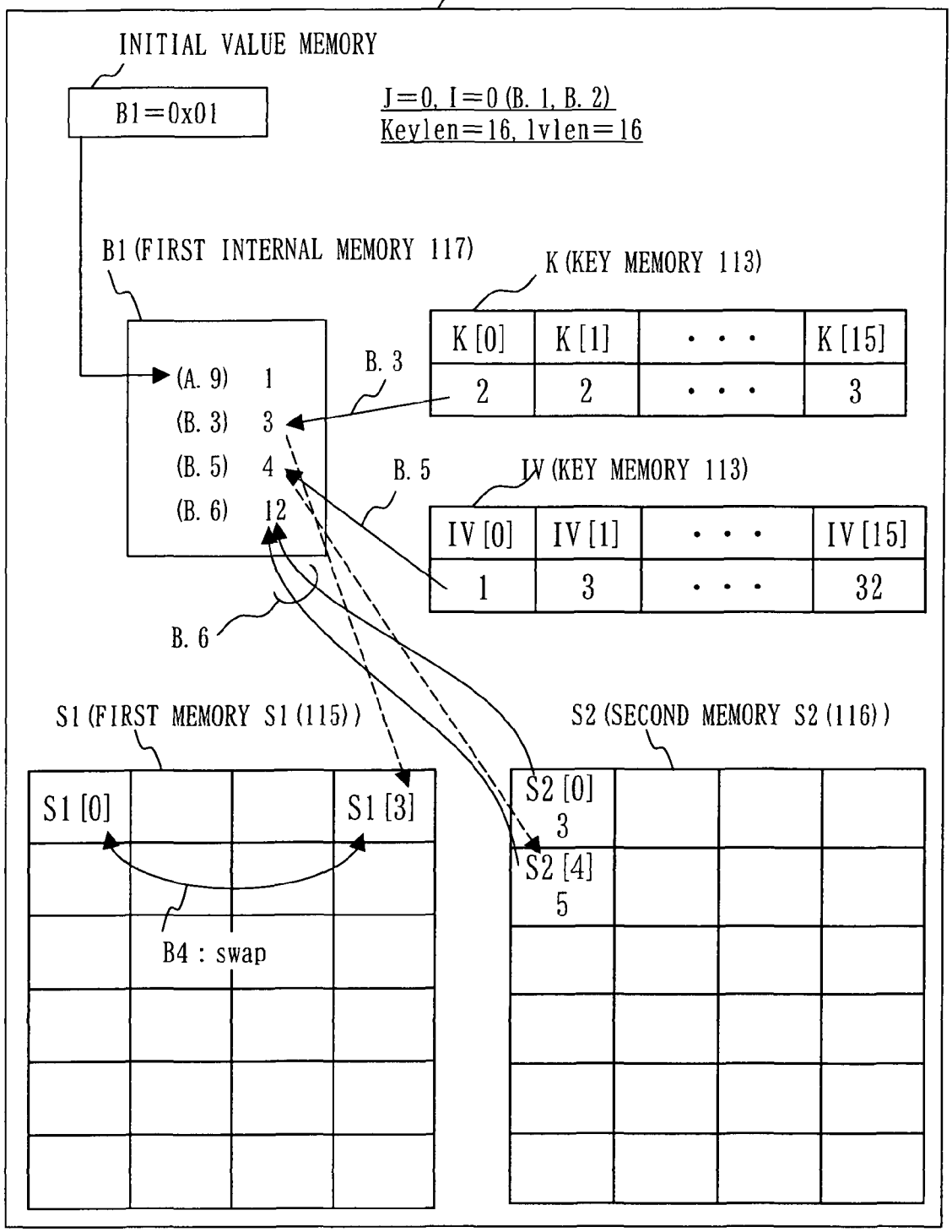
FIG. 14 explains FIG. 13 using concrete numerical values.
Figure 15:
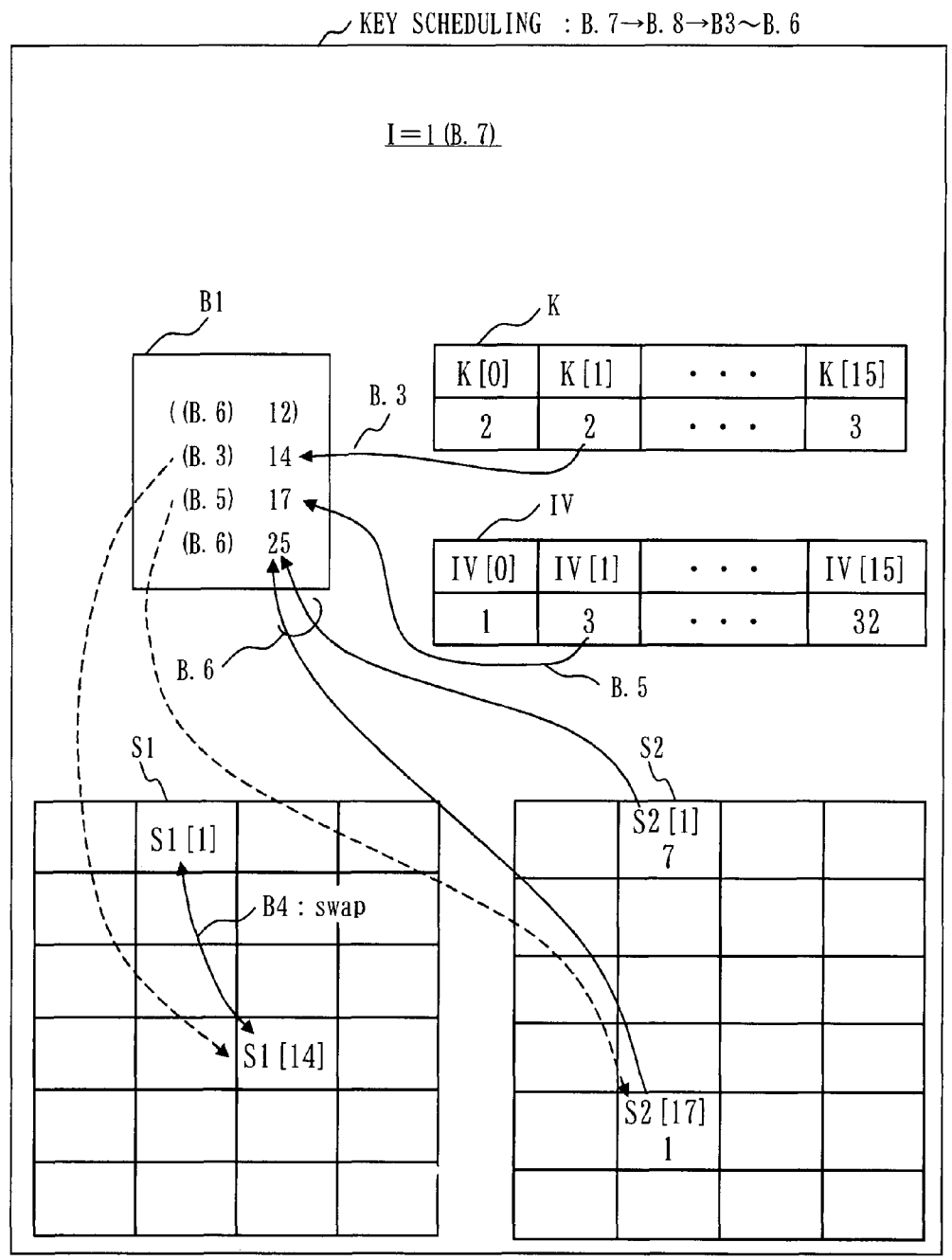
FIG. 15 explains FIG. 13 using concrete numerical values.

FIGS. 14 and 15 explain FIG. 12 by using concrete numerical values. FIG. 14 explains concrete status of the processes of B.1 through B.6. FIG. 15 explains concrete status of the processes of B.7 to B.8 to B.3 to B.6. In the following, B. key scheduling will be explained concretely using FIGS. 14 and 15.

The following shows the operation of the key scheduling unit 130.

(1) At B.1, it is set as J=0. That is, the processes are for the $0^{th}$ byte of the internal table S1 and the internal table S2.
(2) At B.2, it is set as I=0.
(3) At B.3, it is set as B1=3. The following shows a detail.
It is set by the key scheduling unit 130 as
B1=(B1+K[I % Keylen]) %256.
In this case, as shown in FIG. 14,
B1=1 (from A.9),
I=0,
Keylen=16 (assumed), and
K[0]=2 (assumed).
Accordingly, $$B1 = (B1 + K[I \% Keylen]) \% 256$$
$$= (1 + K[0\% 16]) \% 256$$
$$= (1 + K[0]) \% 256$$
$$= (1 + 2) \% 256$$
$$= 3.$$

Therefore, B1 = 3.

(4) At B.4, the key scheduling unit 130 replaces (swaps) S1[0]$_0$ with S1[3]$_0$.
The following shows a detail.
The key scheduling unit 130 implements Swap(S1[I]$_J$, S2[B1]$_J$). In the current example,
since I=0, J=0, and B1=3 (from the above B.3), $$\text{Swap } (S1[I]_J, S1[B1]_J) = \text{Swap } (S1[0]_0, S1[3]_0).$$

Accordingly, the key scheduling unit 130 swaps S1[0]$_0$, with S1[3]$_0$.
(5) At B.5, it is set by the key scheduling unit 130 as B1=4.
The following shows a detail.
The key scheduling unit 130 sets B1 from
B1=(B1+IV[I % Ivlen]) %256.
In this case,
B1=3, I=0, and Ivlen=16 (assumed).
Further, it is set as IV[0]=1 (assumed).
Accordingly, $$B1 = (B1 + IV[I \% Ivlen]) \% 256$$
$$= (3 + IV[0\% 16]) \% 256$$
$$= (3 + IV[0]) \% 256$$
$$= (3 + 1) \% 256$$
$$= 4.$$

Therefore, B1 = 4.

(6) At B.6, it is set by the key scheduling unit 130 as B1=12.
The following shows a detail.
The key scheduling unit 130 newly sets B1 from
B1=B1 xor ((S2[I]$_J$+S2[B1])$_J$) %256.
In this case,
B1=4 (from the above B.4), I=0, and J=0.
Further, it is assumed that
S2[0]$_0$=3, S2[4]$_0$=5.
Accordingly, $$\begin{aligned}
B1 &= B1 \ xor \ ((S2[I]_J + S2[B1]_J) \ \% \ 256) \\
&= 4 \ xor \ ((S2[0]_0 + S2[4]_0) \ \% \ 256) \\
&= 4 \ xor \ ((3 + 5) \ \% \ 256) \\
&= 4 \ xor \ (8) \\
&= 12.
\end{aligned}$$

Therefore, B1 = 12.

Next, the processes of B.7 to B.8 to B.3 to B.6 will be explained concretely using FIG. 15.
(1) At B.7, it is set as I=I+1.
Therefore, I=0+1=1.
(2) Further, since I=1, at B.8, the process will forward to B.3.
(3) At B.3, it is set by the key scheduling unit 130 as B1=14.
The following shows a detail.
The key scheduling unit 130 newly sets B1 from
B1=(B1+K[I % Keylen]) %256.
In this case,
B1=12 (from the above B.6), I=1, and Keylen=16.
Further, it is assumed K[1]=2.
Accordingly, $$\begin{aligned}
B1 &= (B1 + K[I \ \% \ Keylen]) \ \% \ 256 \\
&= (12 + K[1 \% \ 16]) \ \% \ 256 \\
&= (12 + K[1]) \ \% \ 256 \\
&= (12 + 2) \ \% \ 256 \\
&= 14.
\end{aligned}$$

Therefore, B1 = 14.

(4) At B.4, the key scheduling unit 130 swaps S1[1]$_0$ with S1[14]$_0$.
The following shows a detail.
The key scheduling unit 130 implements Swap(S1[I]$_J$, S2[B1]$_J$). In the current example,
since I=1, J=0, and B1=14 (from the above B.3), $$\text{Swap} \ (S1[I]_J, S1[B1]_J) = \text{Swap} \ (S1[1]_0, S1[14]_0).$$

Accordingly, the key scheduling unit 130 swaps S1[1]$_0$ with S1[14]$_0$.
(5) At B.5, it is set by the key scheduling unit 130 as B1=17.
The following shows a detail.
The key scheduling unit 130 sets B1 from
B1=(B1+IV[I % Ivlen]) %256.
In this case,
B1=14 (from the above B.3), I=1, and Ivlen=16.
Further, it is assumed IV[1]=3.
Accordingly, $$\begin{aligned}
B1 &= (B1 + IV[I \ \% \ Ivlen]) \ \% \ 256 \\
&= (14 + IV[1 \% \ 16]) \ \% \ 256 \\
&= (14 + IV[1]) \ \% \ 256 \\
&= (14 + 3) \ \% \ 256 \\
&= 17.
\end{aligned}$$

Therefore, B1 = 17.

(6) At B.6, it is set by the key scheduling unit 130 as B1=25.
The following shows a detail.
The key scheduling unit 130 newly sets B1 from
B1=B1 xor ((S2[1]$_J$+S2[B1]$_J$) %256.
In this case,
B1=17 (from the above B.5), I=1, and J=0.
Further, it is assumed that
S2[1]$_0$=7, S2[17]$_0$=1.
Accordingly, $$\begin{aligned}
B1 &= B1 \ xor \ ((S2[I]_J + S2[B1]_J) \ \% \ 256) \\
&= 17 \ xor \ ((S2[1]_0 + S2[17]_0) \ \% \ 256) \\
&= 17 \ xor \ ((7 + 1) \ \% \ 256) \\
&= 17 \ xor \ 8 \\
&= 25.
\end{aligned}$$

Therefore, B1 = 25.

(7) In this way,
in the internal table S1, by implementing B.1 through B.10,
in the internal table S1,
at J=0 ($0^{th}$ byte),
S1[0]$_0$ is swapped with the predetermined match;
S1[1]$_0$ is swapped with the predetermined match;
......, and
S1[255]$_0$ is swapped with the predetermined match.
Similarly,
at J=1 ($1^{st}$ byte),
S1[0]$_1$ is swapped with the predetermined match;
S1[1]$_1$ is swapped with the predetermined match;
......, and
S1[255]$_1$ is swapped with the predetermined match.
The same processes are done for cases of J=2 ($2^{nd}$ byte) and J=3 ($3^{rd}$ byte). As discussed above, the key scheduling is implemented by the key scheduling unit 130.

Here, as shown in FIG. 9, since the algorithm of key scheduling for the internal table S1 (B.1 through B.10) and the algorithm of key scheduling for the internal table S2 (B.11 through B.20) are the same, the algorithm can be shared. Because of this, the size of the program can be reduced by half compared with a case of creating the both.

(C. Stream Generation (S103))

Next, the pseudo-random number generation implemented by the stream generating unit 140 will be explained using FIGS. 16 through 21. The "stream generation" is a process for generating random number sequences alternating the roles of the internal table S1 and the internal table S2.

FIG. 16 shows a program implemented by each component of the stream generating unit 140.

Figure 17:
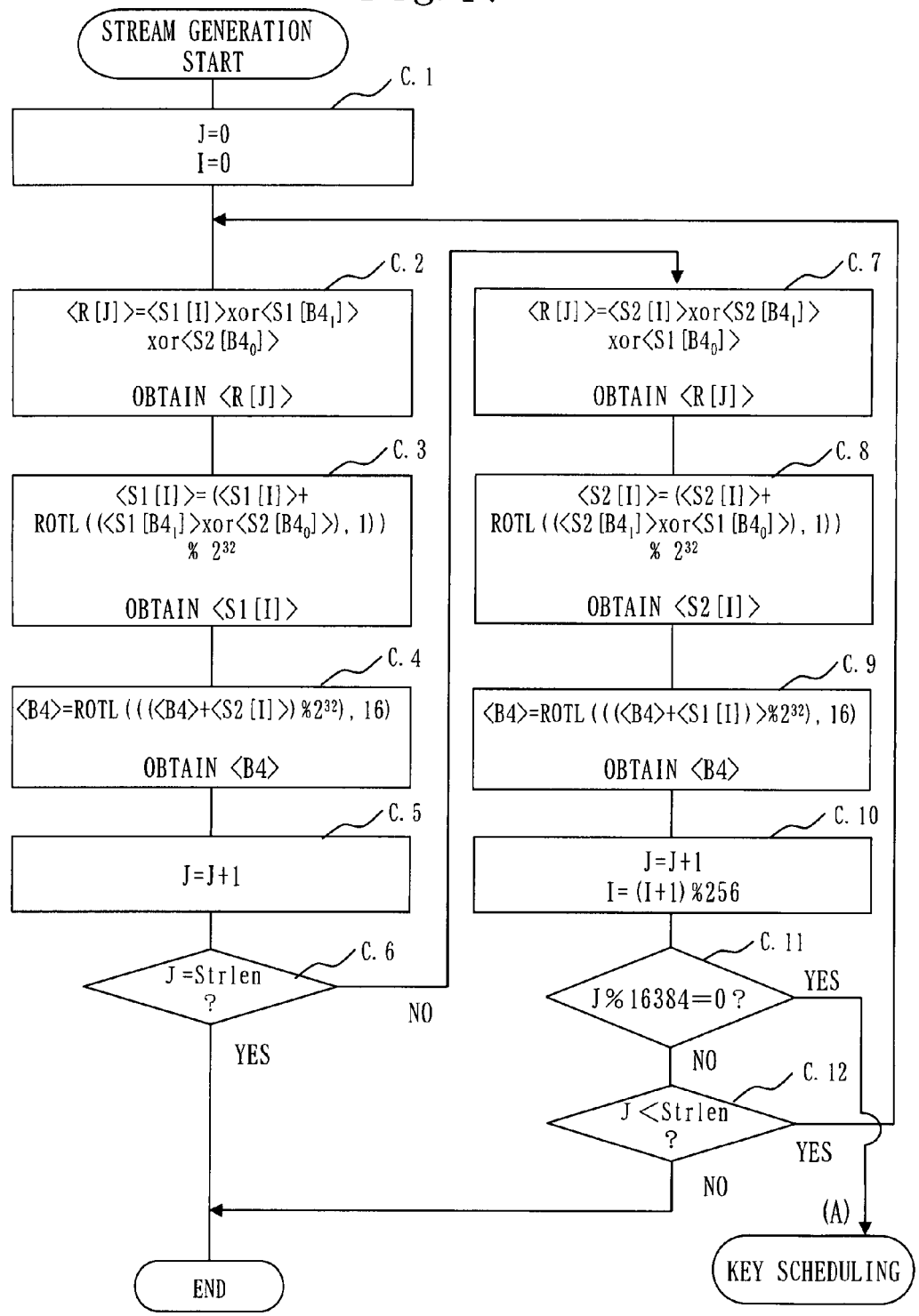
FIG. 17 shows a flowchart of FIG. 16.

FIG. 17 is a flowchart showing FIG. 16.

Figure 18:
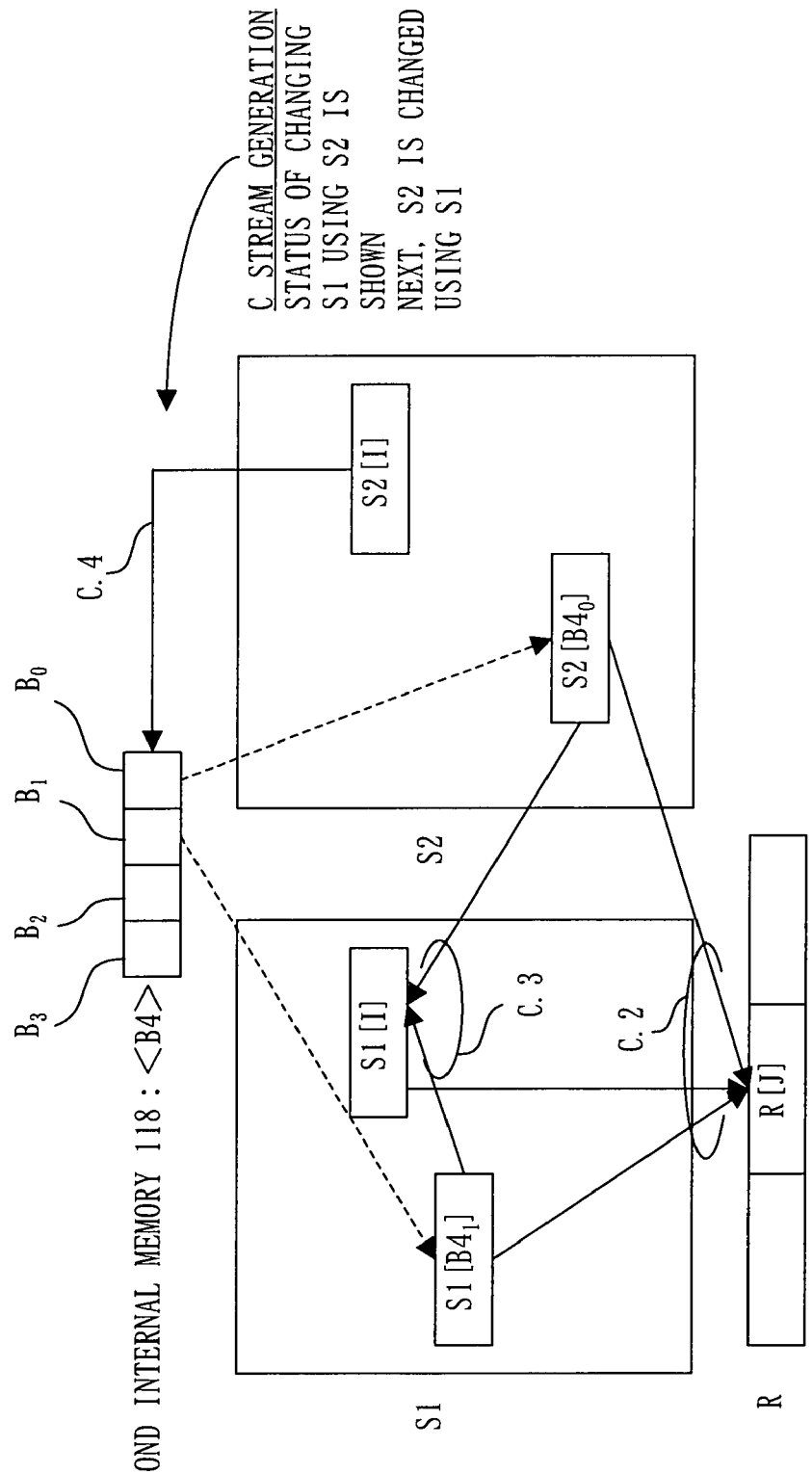
FIG. 18 illustrates C.2 through C.4 of FIG. 16.

FIG. 18 illustrates C.2 through C.4.

FIG. 18 will be explained briefly. The pseudo-random number generator 100 implements the following operations.

(1) At C.2, <S1[B4$_1$]> is determined from B4$_1$ set in the second internal memory 118, and <S2[B4$_0$]> is determined from B4$_0$. Then, <R[J]> is generated from <S1[I]>, <S1[B4$_1$]>, and <S2[B4$_0$]>. Here, B4$_0$ shows a value of the first lowest byte of <B4> having four bytes. B4$_1$ shows a value of the second lowest byte of <B4> having four bytes. When examples are taken from the second internal memory 118 of FIG. 19 which will be discussed later, B4$_0$=78$_{(16)}$ and B4$_1$=56$_{(16)}$. In the following explanation, since numerical values expressed by hexadecimal numbers are used for <B4>, values are written as "78$_{(16)}$", etc. in which the subscript (16) shows "78" is a hexadecimal number. When a value has no subscript, such value is a decimal number.

(2) At C.3, <S1[I]> is newly generated based on <S1[B4$_1$]> and <S2[B4$_0$]>.

(3) At C.4, B4 is updated based on <S2(I)>.

(4) In the above process, <R[J]> is generated based on <S1[B4$_1$]>, <S1[I]>, and <S2[B4$_0$]>, and the next internal status is determined according to <S2[I]> other than these three values and <B4> (C.4). The value of this <S2[I]> does not directly affect <R[J]>. That is, it is impossible to estimate the value of <S2[I]> from <R[J]>, which increases security. Because of this, an attacker can hardly estimate <S2[I]> from the generated <R[J]>, and thus security is improved.

Figure 19:
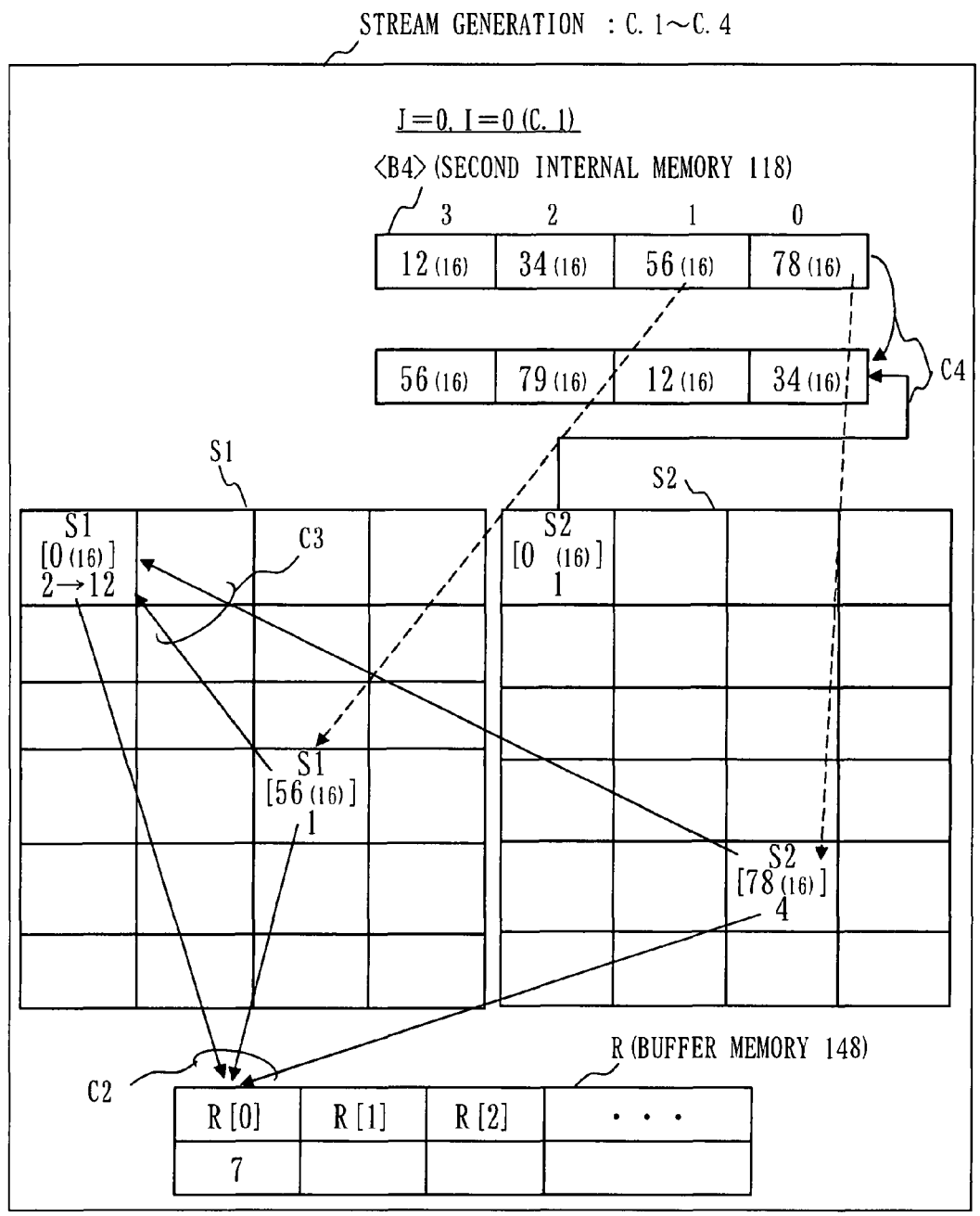
FIG. 19 explains FIG. 18 using concrete numerical values.
Figure 20:
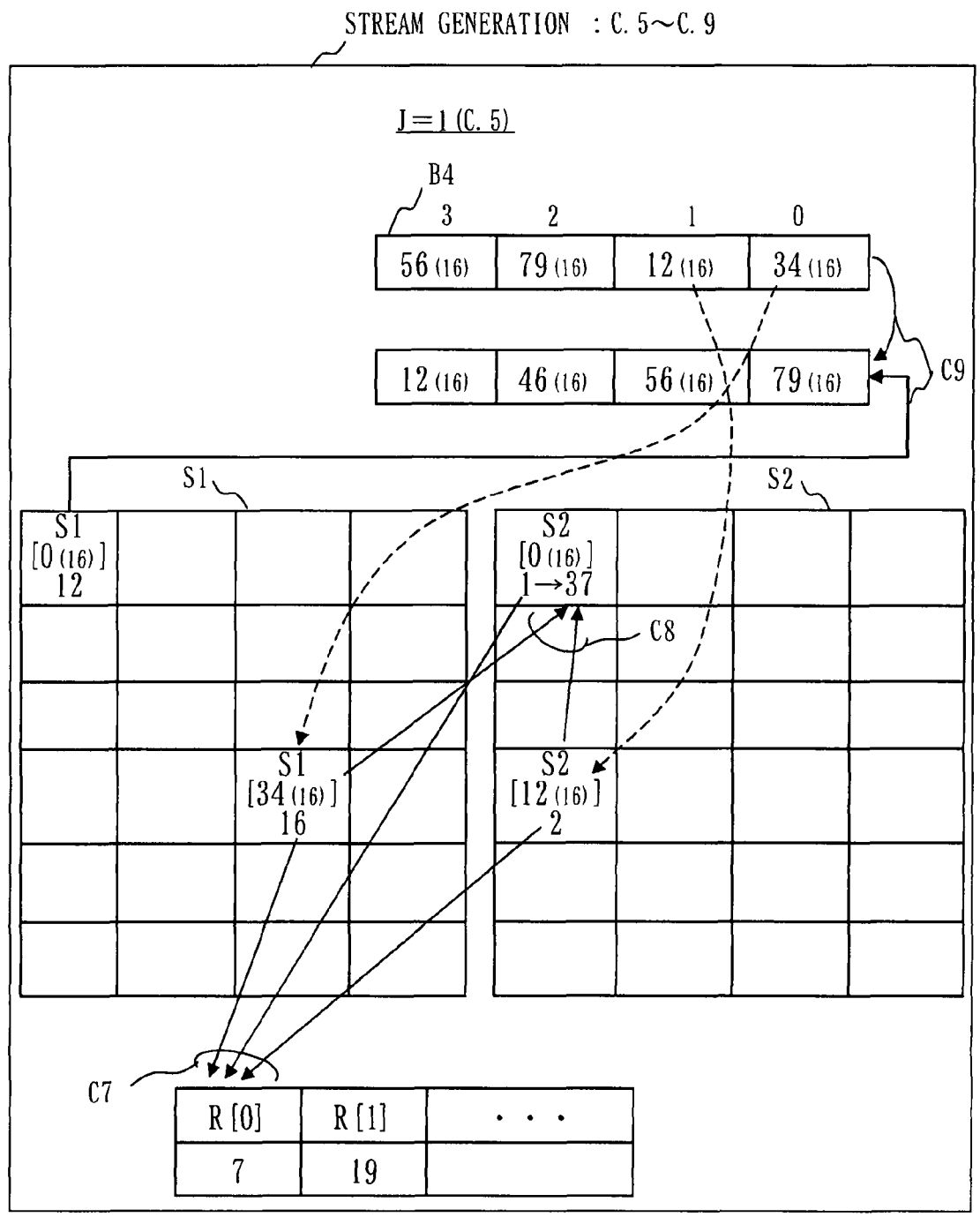
FIG. 20 explains FIG. 18 using concrete numerical values.

FIGS. 19 and 20 explain FIG. 18 by using concrete numerical values. In the following, generation of pseudo-random number will be explained with concrete numerical values by referring to FIGS. 19 and 20.

First, processes of C.1 through C.4 will be discussed by referring to FIG. 19.

(1) At C.1, it is set as I=0 and J=0.
Further, it is assumed that the initializing unit 120 sets <B4>=0x12345678
in the second internal memory 118.

(2) At C.2, the first random number generating unit 141 generates <R[0]>=7.
The following shows a detail.
The first random number generating unit 141 implements
<R[J]>=<S1[I]> xor <S1[B4$_1$]> xor <S2[B4$_0$]>
to generate a random number <R[J]>.
In this case,
J=0, I=0, B4$_1$=56$_{(16)}$, and B4$_0$=78$_{(16)}$.
Further, as shown in FIG. 19, it is assumed that
<S1[0]>=2, <S1[56$_{(16)}$]>=1, and <S2[78$_{(16)}$]>=4.
In this case, $$<R[0]> = <S1[0]> \text{ xor } <S1[56_{(16)}]> \text{ xor } <S2[78_{(16)}]>$$
$$= 2 \text{ xor } 1 \text{ xor } 4$$
$$= 7.$$

Therefore,
<R[0]>=7.

(3) At C.3, the first state changing unit 142 operates <S1[B4$_1$]> and <S2[B4$_0$]> shifts, and <S1[I]> is rewritten by the shifted value.
Namely, the first state changing unit 142 implements
<S1[I]>=(<S1[I]>+ROTL((<S1[B4$_1$]> xor <S2[B4$_0$]>), 1)), %2$^{32}$.
Here, ROTL(x, s) means to shift rotationally 32-bit data x to the left by s bits.

For example, in case of ROTL(5,1), a decimal number "5" is expressed by binary notation as
"00 . . . 0101$_{(2)}$".
Accordingly,
ROTL(5, 1)="00 . . . 1010$_{(2)}$",
which means 10 by decimal notation.
Therefore,
ROTL(5, 1)=10.
Here, since I=0, the left-hand side is <S1[0]>. Further, <S1[0]>, etc. in the right-hand side are the same as the values in the right-hand side of <R[0]> in C.2.
Accordingly, each value of the right-hand side becomes <S1[0]>=2, <S1[56$_{(16)}$]>=1, and <S2[78$_{(16)}$]>=4.
Then, $$<S1[0]> = \left( \begin{array}{c} (<S1[0]> + ROTL \\ ((<S1[56_{(16)}]> \text{ xor } <S2[78_{(16)}]>), 1)) \end{array} \right) \% 2^{32}$$
$$= (2 + ROTL((1 \text{ xor } 4), 1)) \% 2^{32}$$
$$= (2 + ROTL(5, 1)) \% 2^{32}$$
$$= (2 + 10) \% 2^{32}$$
$$= 12.$$

Therefore, <S1[0]>=12.
As shown in FIG. 19, 2 can be rewritten by 12 for <S1[0]>.

(4) At C.4, the first exchanging unit 143 exchanges an upper digit value with a lower digit value of words stored in <B4> which is the second internal memory 118.
Namely, the first exchanging unit 143 implements
<B4>=ROTL(((<B4>+<S2[I]>) %2$^{32}$), 16).
Here, in the right-hand side,
<B4>=0x12345678,
and I=0.
Further, it is assumed that <S2[0]>=1.
Accordingly, $$<B4> = ROTL(((<B4> + <S2[I]>) \% 2^{32}), 16)$$
$$= ROTL(((<B4> + <S2[0]>) \% 2^{32}), 16)$$
$$= ROTL(((0 \times 12345678 + 1) \% 2^{32}), 16)$$
$$= ROTL(((0 \times 12345679) \% 2^{32}), 16)$$
$$= 0 \times 56791234.$$

Therefore,
<B4>=0x56791234.
In the following, processes of C.5 through C.9 will be explained by referring to FIG. 20.

(5) At C.5, J=J+1. In this case, J=1.
(6) At C.6, J≠Strlen.
(7) At C.7, the second random number generating unit 144 generates <R[1]>=19.
The following shows a detail.
The second random number generating unit 144 implements
<R[J]>=<S2[1]> xor <S2[B4$_1$]> xor <S1[B4$_0$]>
to generate a random number <R[J]>.
In this case,
J=1,
I=0,
B4$_1$=12$_{(16)}$,
B4$_0$=34$_{(16)}$, and
<S2[0]>=1.

Further, it is assumed that
$<S2[12_{(16)}]>=2$, and $<S2[34_{(16)}]>=16$.
In this case, $$<R[0]> = <S2[0]> \text{ xor } <S2[12_{(16)}]> \text{ xor } <S1[34_{(16)}]>$$
$$= 1 \text{ xor } 2 \text{ xor } 16$$
$$= 19.$$

Therefore,
$<R[1]>=19$.
(8) At C.8, the second state changing unit 145 operates $<S2[B4_1]>$ and $<S1[B4_0]>$ and shifts, and $<S2[I]>$ is rewritten by the shifted value.
Namely, the second state changing unit 145 implements
$<S2[I]>=(<S2[I]>+ROTL((<S2[B4_1]> \text{ xor } <S1[B4_0]>), 1)) \%2^{32}$.
Here, $<S2[I]>$, etc. in the right-hand side are the same as the values in the right-hand side of $<R[J]>$ in C.7. Accordingly, each value of the right-hand side becomes
$<S2[0]>=1$,
$<S2[12_{(16)}]>=2$, and
$<S1[34_{(16)}]>=16$.
Then, $$<S2[0]> = \left( \begin{array}{c} (<S2[0]>+ROTL \\ ((<S2[12_{(16)}]> \text{ xor } <S1[34_{(16)}]>),1)) \end{array} \right) \%2^{32}$$
$$= (1+ROTL((2 \text{ xor } 16),1)) \%2^{32}$$
$$= 37.$$

Therefore, $<S2[0]>=37$.
As shown in FIG. 20, 1 can be rewritten by 37 for $<S2[0]>$.
(9) At C.9, the second exchanging unit 146 exchanges an upper digit value with a lower digit value of words stored in $<B4>$ which is the second internal memory 118.
Namely, the second exchanging unit 146 implements
$<B4>=ROTL(((<B4>+<S1[I]>)\%2^{32}), 16)$.
Here,
$<B4>=0x56791234$,
$I=0$, and
$<S1[0]>=12$ (this has been rewritten at C.3).
Accordingly, $$<B4> = ROTL(((<B4>+<S2[I]>)\%2^{32}), 16)$$
$$= ROTL(((<B4>+<S1[0]>)\%2^{32}), 16)$$
$$= RTOL(((0 \times 56791234+12)\%2^{32}), 16)$$
$$= ROTL((0 \times 56791246), 16)$$
$$= 0 \times 12465679.$$

(10) The looping unit 147 repeats the operations of the first random number generating unit 141, the first state changing unit 142, and the first exchanging unit 143, and the operations of the second random number generating unit 144, the second state changing unit 145, and the second exchanging unit 146 until the stream becomes to have the stream length stored in the stream length memory 111.
(11) The buffer memory 148 inputs a pseudo-random number R1 output from the first random number generating unit 141 and a pseudo-random number R2 output from the second random number generating unit 144 to hold temporarily and outputs as a pseudo-random number stream.
(12) The rescheduling unit 149 causes the key scheduling unit 130 to operate when the stream length of the pseudo-random number output to the buffer memory 148 becomes to have a predetermined rescheduling length to redo the key scheduling (C.11). Here, for example, the following is used for the predetermined "rescheduling length" ""the number of words in the internal table" x "the number of bytes of a word" x "the number of memories" x "the number of shifts required by rotationally shifting the second internal memory (32 times, from C.4 and C.9)"".
Here,
(a) "the number of a word in the internal table" means the number of words in the internal table S1 or the internal table S2; in case of the first embodiment, it is 256.
(b) "the number of bytes of words" means the number of bytes of one word in the internal table, and it is 4.
(c) "the number of memories" means two including the first memory S1 and the second memory S2.
(d) "the number of shifts required by rotationally shifting the second internal memory 118" means the number of shifts required by rotationally shifting the memory $<B4>$ at C.4 and C.9, and it is 32 times.
According to (a) through (d), "rescheduling length" is, for example
"rescheduling length"$=256 \times 4 \times 2 \times 32$ $$= 65,536 \text{ bytes}(16,384 \text{ words})$$
$$= 64 \text{ KB}.$$

In case of explanation using a flowchart of FIG. 17, at C.11, the rescheduling unit 149 checks if the length of pseudo-random number sequence (a value of J) is as long as Strlen, which is a predetermined "rescheduling length". When the rescheduling unit 149 judges that the length is "rescheduling length", the operation proceeds to (A) in FIG. 10, and the rescheduling unit 149 makes the key scheduling unit 130 operate to redo the key scheduling.
(13) The pseudo-random number generator 100 operates XOR (exclusive OR) of the pseudo-random number stream R[0], R[1] . . . generated by the stream generating unit 140 and plaintext to create ciphertext.

In the above stream generation, the internal table S1 and the internal table S2 generate sequentially a pseudo-random number R with alternately exchanging roles of "random number generation" and "address generation". On the other hand, a conventional RC4 carries out using one table.

Here, in the above generating method of a pseudo-random number by the pseudo-random number generator 100, a pseudo-random number is generated using two tables of the internal table S1 and the internal table S2. This is, however, merely an example; a pseudo-random number can be generated based on three internal tables; and also a pseudo-random number can be generated based on four internal tables. Any number of internal tables can be used.

Since a series of operations of the initializing unit 120, the key scheduling unit 130, and the stream generating unit 140 of the pseudo-random number generator 100 mutually relate, it is possible to grasp these series of operations as a pseudo-random number generating method.

Figure 22:
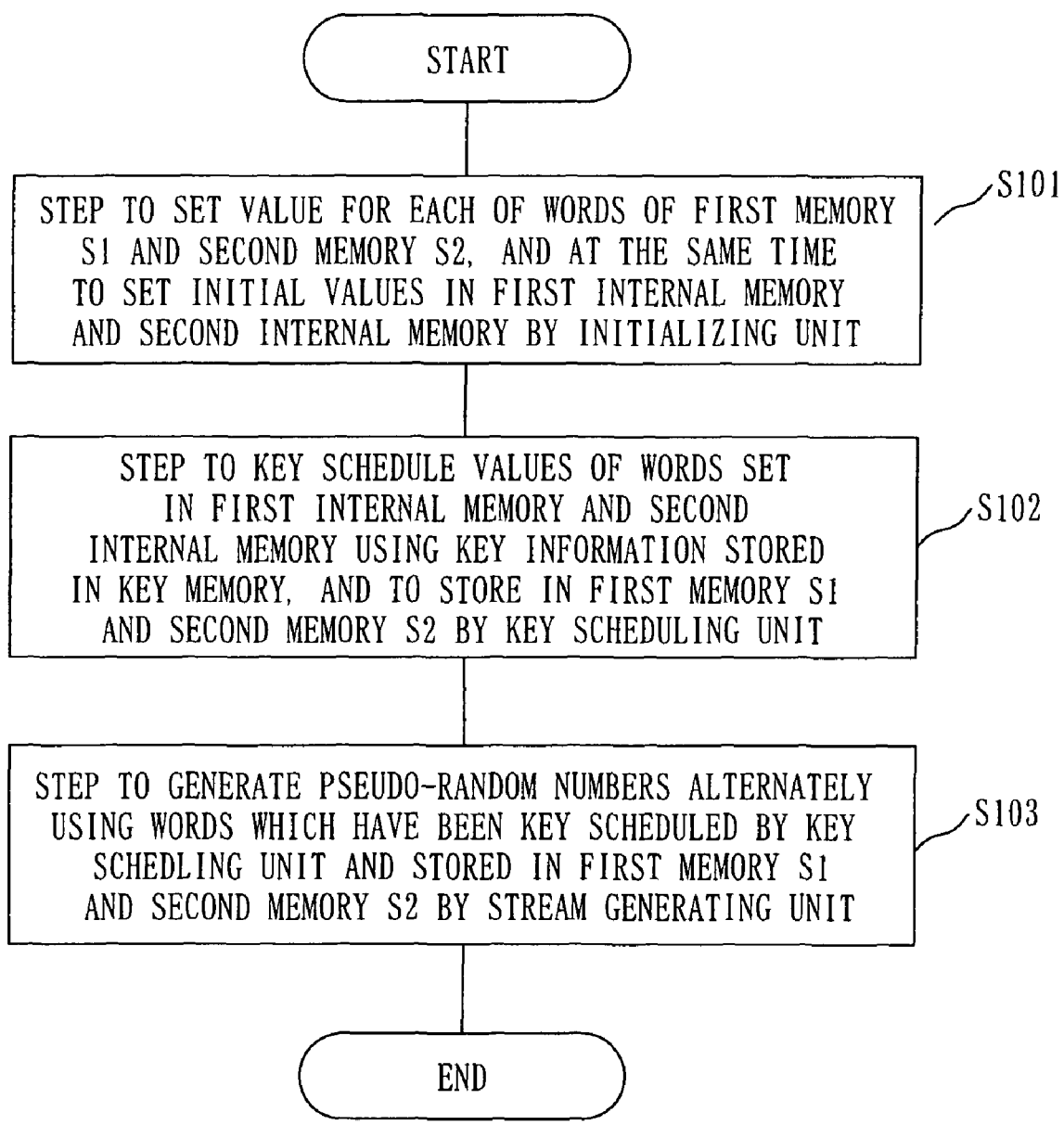
FIG. 22 shows steps of a pseudo-random number generating method.

FIG. 22 shows a flowchart showing the operations of the initializing unit 120, etc. of the pseudo-random number generator 100 when it is grasped as the pseudo-random number generating method.

(1) S101 is a step to set a value for each of words of the first memory S1 and the second memory S2, and at the same time to set initial values in the first internal memory and the second internal memory by the initializing unit.

(2) S102 is a step to key schedule values of words set in the first memory S1 and the second memory S2 using the key information stored in the key memory and to store in the first memory S1 and the second memory S2 by the key scheduling unit.

(3) S103 is a step to generate a pseudo-random number by the stream generating unit alternately using the words which have been key scheduled by the key scheduling unit and stored in the first memory S1 and the second memory S2.

Further, it is possible to grasp a series of operations of the initializing unit 120, the key scheduling unit 130, and the stream generating unit 140 of the pseudo-random number generator 100 as an embodiment of program by replacing the series of operations with a series of processes.

Figure 23:
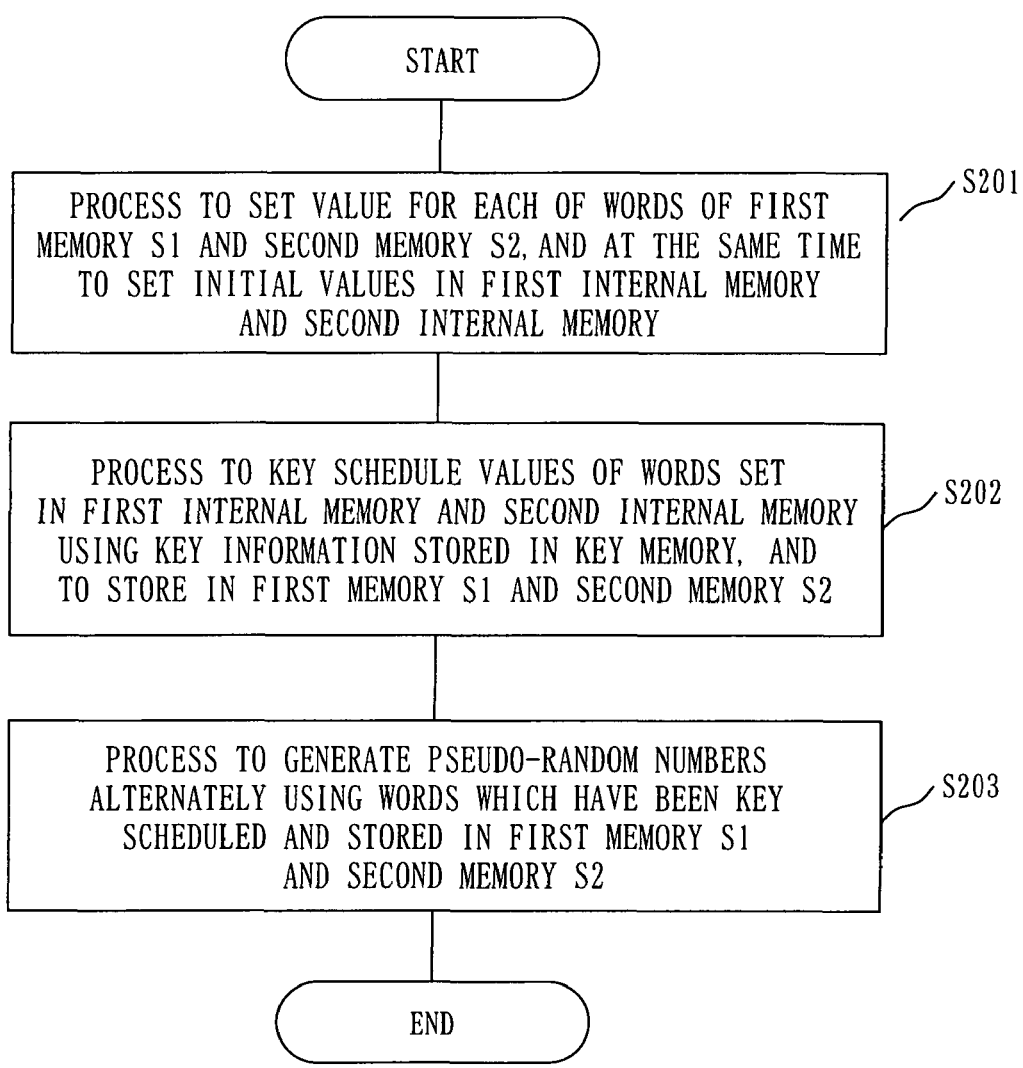
FIG. 23 shows processes of a pseudo-random number generating program.
Figure 25:
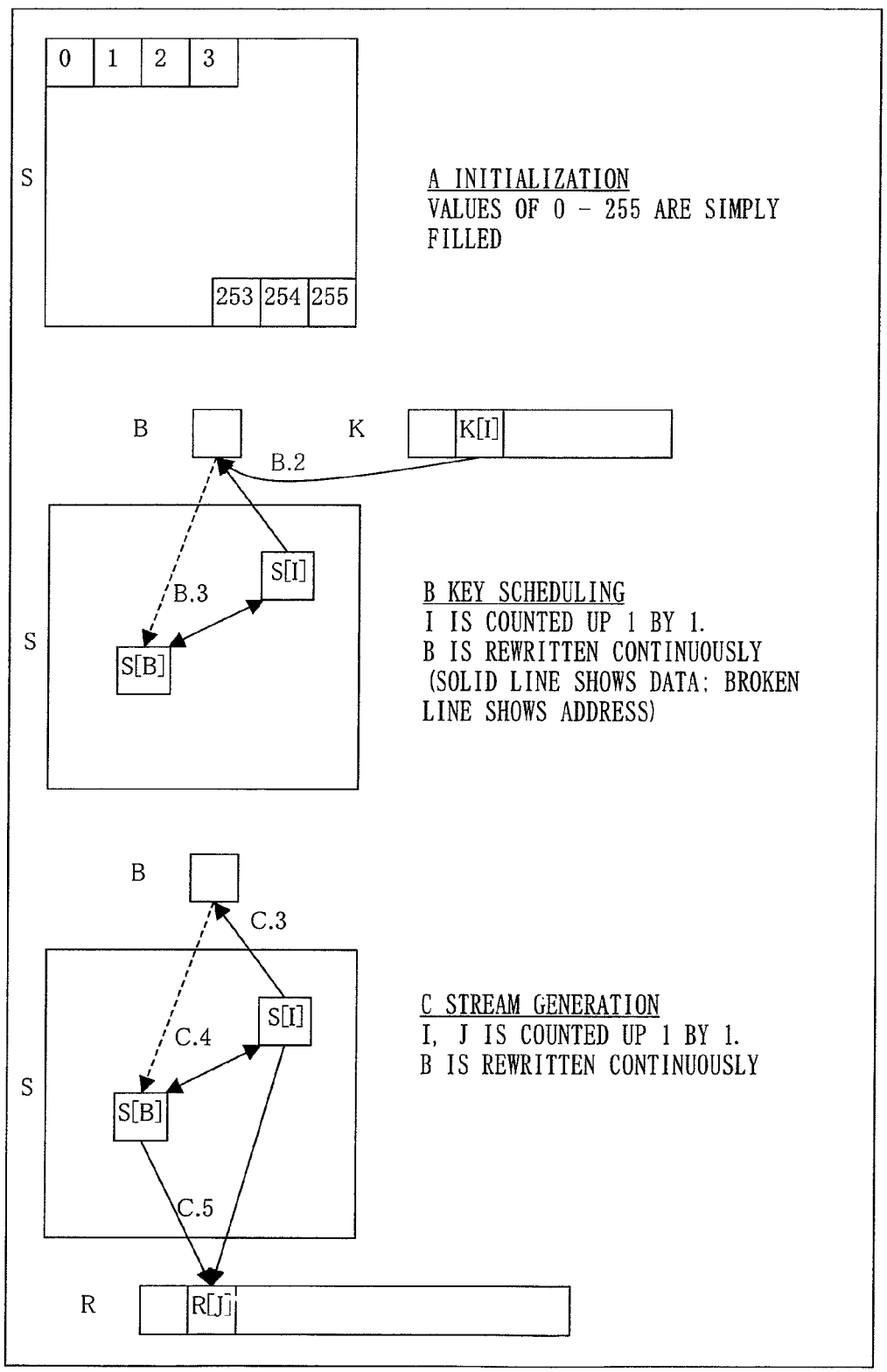
FIG. 25 explains a conventional art.

FIG. 23 shows the operations of the initializing unit 120, etc. of the pseudo-random number generator 100 when it is grasped as the pseudo-random number generating program including a series of processing to be implemented by the pseudo-random number generator 100 which is a computer.

(1) S201 is a process to set a value for each of words of the first memory S1 and the second memory S2, and at the same time to set initial values in the first internal memory and the second internal memory.

(2) S202 is a process to key schedule values of words set in the first memory S1 and the second memory S2 using the key information stored in the key memory to store in the first memory S1 and the second memory S2.

(3) S203 is a process to generate a pseudo-random number alternately using the words key scheduled and stored in the first memory S1 and the second memory S2.

Here, at C.2 shown in FIG. 16, the value of word <S2[B4$_0$]> of the internal table S2 is used other than the values of words of <S1[I]> and <S1 [B4$_1$]> of the internal table S1. Further, at C.7, the value of word <S1[B4$_0$]> of the internal table S1 is used other than the values of words of <S2[I]> and <S2[B4$_1$]> of the internal table S2. These are an example. The stream generating unit 140 of the pseudo-random number generator 100 can generate a pseudo-random number by alternately using words stored in the internal table S1 (the first memory S1 (115)) and the internal table S2 (the second memory S2 (116)) on which key scheduling has been done by the key scheduling unit 130.

In such a case,
At C.2, $$<R[J]> = <S1[I]> \text{ xor } <S1[B4_1]> \quad \text{(expression 1)}$$

is implemented.
In such a case, at C.7, $$<R[J]> = <S2[I]> \text{ xor } <S2[B4_1]> \quad \text{(expression 2)}$$

is implemented.
In this case, in FIG. 18 (corresponding to the above (expression 1)), since the relationship between <R[J]> and <S2[B4$_0$]> is cut off, it becomes difficult for an attacker to estimate internal status from the generated value of R[J], which increases security.

Another example of operation of the stream generating unit 140 using the above (expression 1) and (expression 2) will be explained by referring to FIG. 21.

(1) The first random number generating unit 141 of the stream generating unit 140 generates an address of the first memory S1 (115) from a value of the first memory S1 (115) and generates a pseudo-random number from the value of word of the generated address in the first memory S1 (115) (at C.9 and C.2 which is the above (expression 1)). That is, as shown in FIG. 21, the first random number generating unit 141 generates <B4> which is to be an address of <S1[B4$_1$]> at C.2 from the value S1[I] of the first memory S1 (115) at C.9 (ST1). Then, at C.9, the first random number generating unit 141 specifies the value of word <S1[B4$_1$]> of the first memory S1 (115) at the generated address B4$_1$ (ST2), and generates a pseudo-random number <R> from the specified value of word <S1[B4$_1$]> and <S1[I]> by the above (expression 1) (ST3).

Figure 21:
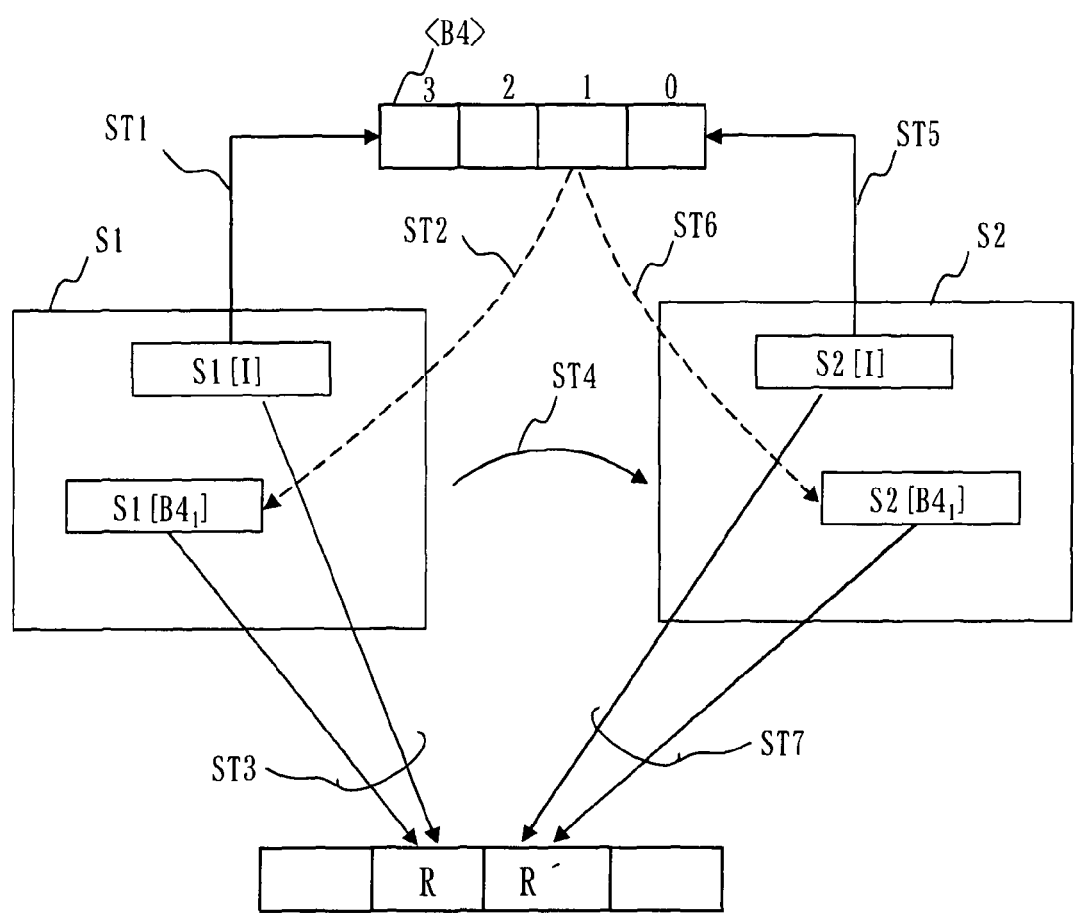
FIG. 21 shows an example of another operation of the stream generating unit 140.

(2) As shown in FIG. 21, subsequently at ST4, the role is moved from the internal table S1 (the first memory S1 (115)) to the internal table S2 (the second memory S2 (116)). The second random number generating unit 144 of the stream generating unit 140 generates an address of the second memory S2 (116) from a value of the second memory S2 (116), and generates a pseudo-random number from the value of word at the generated address in the second memory S2 (116) (at C.4 and C.7 which is the above (expression 2)). Namely, the second random number generating unit 144, at C.4, generates <B4> which is to be an address of <S2[B4$_1$]> at C.7 from the value S2[I] of the second memory S2 (116) (ST5). Then, at C.7, the first random number generating unit 141 specifies the value of word <S2[B4$_1$]> at the generated address B4$_1$ in the second memory S2 (116) (ST6), and generates a pseudo-random number <R'> from the specified value of word <S2[B4$_1$]> and <S2[I]> using the above (expression 2) (ST7).

(3) Like the above (1) and (2), the first random number generating unit 141 and the second random number generating unit 144 generate pseudo random numbers R, R', etc. alternately using words stored in the first memory S1 (115) and the second memory S2 (116).

Although the above discussed pseudo-random number generator, the pseudo-random number generating method, and the pseudo-random number generating program is for a generator of stream cipher, these can be used as a encrypting apparatus for text (plaintext) and also can be used as a decrypting apparatus for ciphertext.

Further, the above discussed pseudo-random number generator and the pseudo-random number generating method can be accomplished as a program (software) operated by a computer as shown in FIG. 3 or FIG. 23. When implemented by the program, the apparatus and the method can be accomplished as a semiconductor chip or an IC chip, which can be used by any type of electronic devices.

Preferred applications of the above discussed pseudo-random number generator, the pseudo-random number generating method, and the pseudo-random number generating program are, for example, encryption or decryption of sentences by a word processor, encryption or decryption of e-mail text, encryption or decryption of communication data through the Internet or the local area network, encryption or decryption of communication data between a mobile phone and a base station, and encryption or decryption of data in an IC tag or an IC card.

In particular, it is suitable for encryption or decryption for communication data of a small device (a mobile phone, an IC tag, an IC card) which has limited capacity of memories.

A pseudo-random number generator according to the first embodiment includes: a key scheduling unit carrying out key scheduling for a first memory S1 and a second memory S2;

and a stream generating unit generating a pseudo-random number by alternately using words stored in the first memory S1 and the second memory S2 on which the key scheduling is done, so that it is possible to improve security against deciphering attack. Further, since the stream generating unit generates a pseudo-random number in word unit, high-speed processing can be accomplished.

In the pseudo-random number generator according to the first embodiment, a first pseudo-random number generator generates a pseudo-random number using the first memory S1 and a second pseudo-random number generating unit generates a pseudo-random number using the second memory S2, and at the same time the first pseudo-random number generating unit and the second pseudo-random number generating unit alternately generate a pseudo-random number. Accordingly, it is possible to improve security against deciphering attack.

In the pseudo-random number generator according to the first embodiment, the key scheduling unit carries out key scheduling for plural internal tables (the first memory S1 and the second memory S2) configured in word unit. Accordingly, it is possible to do swapping in a very large space, which improves security against deciphering attack.

In the pseudo-random number generator according to the first embodiment, the stream generating unit generates a pseudo-random number based on two internal tables, which enables to improve security against deciphering attack.

While the processing is done in byte unit in the conventional art, in the pseudo-random number generator 100 of the first embodiment, the stream generating unit 140 generates a pseudo-random number in word unit (4 bytes), which enables high-speed processing.

Further, while in the processing in byte unit, components implemented in one internal table varies 0-255, that is, 256 variations, there are $2^{32}$ variations of $0-2^{32}-1$ in the pseudo-random number generator 100 of the first embodiment by processing in word unit by the key scheduling unit 130. This enables to implement swapping in a very large space, which improves security.

While swapping is repeatedly done in one internal table according to the conventional art, in the pseudo-random number generator 100 of the first embodiment, the key scheduling unit 130 implements swapping repeatedly by alternately operating the internal table S1 and the internal table S2, so that it is possible to accomplish very long randomness (periodicity). Further, the stream generating unit 140 repeats swapping by alternately operating the internal table S1 and the internal table S2, which enables to accomplish a very long randomness (periodicity).

In the conventional art, after the key scheduling is done once, the process of generating a pseudo-random number is carried out continuously until the key is changed, so that the same random number sequence may be generated after carrying out the process more than a certain number of times. On the other hand, in the pseudo-random number generator 100 of the first embodiment, after the pseudo-random number generating process has been finished once, the rescheduling unit 149 makes the key scheduling unit 130 operate to update the internal tables S1 and the internal table S2 that will be used for generation of pseudo-random number, which prevents generation of the same random number sequence and further improves security.

Since the operation of the conventional art is simple compared with the pseudo-random number generator 100 of the first embodiment, the operation apparently look fast. However, when the program is actually implemented, the first embodiment operates much faster. This is because the stream generation at C.1 through C.11 is carried out in 4 bytes unit in the first embodiment (in 1 byte unit in the conventional art).

On the other hand, generally speaking, it is necessary to harden to estimate the internal status of the table from the obtained stream R[J] in order to improve security (deciphering difficulty) of cipher of lookup table. To improve both operation speed and security, the pseudo-random number generator 100 of the first embodiment implements the following new devices within a range not to decrease the speed much.

(1) While the conventional art has one internal table, the pseudo-random number generator 100 of the first embodiment has two internal tables of the same size. Because of this, it is considered that to estimate the internal status is difficult. Concretely, while the conventional art generates 1 byte from one state of the table of 256 bytes, the pseudo-random number generator 100 of the first embodiment generates a random number R[J] of 4 bytes from one state of the table of 2048 bytes. That is, the pseudo-random number generator 100 has double entropies of the conventional art for 1 byte of the stream.

(2) At "C. Stream generation" in the conventional art, R[J] is generated from S[B] and S[I], and also these two values and B determine the next internal status. On the contrary, in the pseudo-random number generator 100 of the first embodiment, in FIG. 18 for example, although R[J] is generated from S1[B4$_1$], S1[I], and S2[B4$_0$], the next internal status is determined based on S2[I] other than these three values and B4. This value of S2[I] does not directly affect R[J]. That is, it is impossible to estimate the value of S2[I] from R[J], which improves security.

(3) In the pseudo-random number generator 100 of the first embodiment, the internal table S1 and the internal table S2 alternately change the internal status by exchanging their roles. Parts in which the internal table S1 and the internal table S2 exchange their roles correspond, for example, "C.2 through C.5" and "C.7 through C.10". In these two parts, since only difference is that the internal table S1 and the internal table S2 are exchanged, the program can be shared only by exchanging pointers to the initial addresses of the internal tables, which enables to downsize the program.

(4) In the conventional art, the key scheduling is done only once at the beginning and is never done again afterwards. On the contrary, in the pseudo-random number generator 100 of the first embodiment, the key scheduling is repeatedly done every 64 KB. Since the key scheduling completely changes the internal status of the internal tables S1 and S2, this causes a deciphering attacker almost impossible to reproduce the internal status. Frequent key scheduling may decrease the processing speed; however, 64 KB causes no problem in decreasing the processing speed.

(5) By the way, the following shows basis for 64 KB. In order to completely rewrite the internal table S1 and the internal table S2, I needs to move 0 through 255. Until that, 256×4 bytes×2=2 KB of the stream R is generated. Further, there is a command of 1 bit rotational shift internally; this rotation returns to the original place by shifting 32 times. Therefore, it can be considered that the whole data is changed once by 2 KB×32 times=64 KB, which is a good timing for implementing the key scheduling.

The invention claimed is:
1. A pseudo-random number generator generating a pseudo-random number in word unit having a plurality of bytes, comprising:
 a key memory storing key information;

a first memory S1 configured by a plurality of words and accessing a word S1[I] using an address I (I is an integer at least 0);

a second memory S2 being a memory configured by a same number of plurality of words with the first memory S1 and accessing a word S2[I] using the address I;

an initializing unit setting a value for each of words of the first memory S1 and the second memory S2, and setting an initial value in a first internal memory and a second internal memory;

a key scheduling unit key scheduling values of the words set in the first memory S1 and the second memory S2 using the key information stored in the key memory, and storing in the first memory S1 and the second memory S2; and a stream generating unit generating a pseudo-random number by alternately using words which have been key scheduled by the key scheduling unit and stored in the first memory S1 and the second memory S2, wherein said stream generating unit comprises:

a looping unit repeating the operations of the stream generating unit until the stream length of said pseudo-random number becomes a predetermined stream length of a random number to be generated; and a rescheduling unit causing the key scheduling unit to operate when the stream length of the pseudo-random number becomes a predetermined rescheduling length.

2. The pseudo-random number generator of claim 1, wherein the stream generating unit comprises:

a first random number generating unit generating an address of the first memory S1 from a value of a word of the first memory S1 and generating a pseudo-random number from the value of the word at the address generated of the first memory S1; and a second random number generating unit generating an address of the second memory S2 from a value of a word of the second memory S2 and generating a pseudo-random number from the value of the word at the address generated of the second memory S2.

3. A pseudo-random number generator generating a pseudo-random number in word unit having a plurality of bytes, comprising:

a first memory S1 configured by a plurality of words storing a value key scheduled and accessing a word S1[I] using an address I (I is an integer at least 0);

a second memory S2 being a memory configured by a same number of plurality of words with the first memory S1, composed of a plurality of words storing the value key scheduled, and accessing a word S2[I] using the address I; and a stream generating unit generating a pseudo-random number by alternately using words stored in the first memory S1 and the second memory S2, wherein said stream generating unit comprises:

a looping unit repeating the operations of the stream generating unit until the stream length of said pseudo-random number becomes a predetermined stream length of a random number to be generated; and a rescheduling unit causing key scheduling of the words stored in the first memory S1 and the second memory S2 when the stream length of the pseudo-random number becomes a predetermined rescheduling length.

4. A pseudo-random number generator generating a pseudo-random number in word unit having n bytes ($1 \leq n \leq N$, N is an integer at least 1), comprising:

a stream length memory storing a stream length L of a random number to be generated;

a fixed value memory storing a fixed value;

a key memory storing key information;

an initial value memory inputting and storing an initial value;

a first memory S1 being a memory configured by 256 words and accessing a word S1[I] using an address I (I is an integer of 0-255);

a second memory S2 being a memory configured by a same number of plurality of words with the first memory S1 and accessing a word S2[I] using the address I;

a first internal memory storing a value which is the address I;

a second internal memory storing a value in word unit;

a key scheduling unit updating the value I of the first internal memory using the key information stored in the key memory and the initial value stored in the initial value memory, setting a value of the first internal memory as the address I, swapping a value of n-th byte of each word from an initial word to a final word of the first memory S1 with a value of n-th byte of a word S1[I] at the address I of the first memory S1, further setting a value of the first internal memory as the address I, swapping a value of n-th byte of each word from an initial word to a final word of the second memory S2 with a value of n-th byte of a word S2[I] at the address I of the second memory S2, repeating swapping from a first byte to a N-th byte, and key scheduling words stored in the first memory S1 and the second memory S2; and a stream generating unit generating a pseudo-random number by alternately using words which have been key scheduled by the key scheduling unit and stored in the first memory S1 and the second memory S2, wherein said stream generating unit comprises:

a looping unit repeating the operations of the stream generating unit until the stream length of said pseudo-random number becomes the stream length of the random number to be generated; and a rescheduling unit causing the key scheduling unit to operate when the stream length of the pseudo-random number becomes a predetermined rescheduling length.

5. A pseudo-random number generator generating a pseudo-random number in word unit having n bytes ($1 \leq n \leq N$, N is an integer at least 1), comprising:

a stream length memory storing a stream length L of a random number to be generated;

a fixed value memory storing a fixed value;

a key memory storing key information;

an initial value memory inputting and storing an initial value;

a first memory S1 being a memory configured by 256 words and accessing a word S1[I] using an address I (I is an integer of 0-255);

a second memory S2 being a memory configured by a same number of plurality of words with the first memory S1 and accessing a word S2[I] using the address I;

a first internal memory storing a value which is the address I;

a second internal memory storing a value in word unit;

an initializing unit setting a value for each of words of the first memory S1 and the second memory S2 using a fixed value stored in the fixed value memory and setting an initial value in the first internal memory and the second internal memory;

a key scheduling unit updating the value I of the first internal memory using the key information stored in the key memory and the initial value stored in the initial value memory, setting a value of the first internal memory as the address I, swapping a value of n-th byte of each word from an initial word to a final word of the first memory S1 with a value of n-th byte of a word S1[I] at the address I of the first memory S1, further setting a value of the first internal memory as the address I, swapping a value of n-th byte of each word from an initial word to a final word of the second memory S2 with a value of n-th byte of a word S2[I] at the address I of the second memory S2, repeating swapping from a first byte to a N-th byte, and key scheduling words stored in the first memory S1 and the second memory S2; and a first random number generating unit generating values of addresses I2 and I3 from lower 2 bytes of the word stored in the second internal memory, generating a pseudo-random number R1 using a value of each word S1[I1] from the initial word to the final word of the first memory S1, a value of a word S1[I2] at the address I2 of the first memory S1, a value of a word S2[I3] at the address I3 of the second memory S2, and outputting to a buffer memory;

a first state changing unit computing and shifting the value of the word S1[I2] at the address I2 of the first memory S1 and the value of the word S2[I3] at the address I3 of the second memory S2, and rewriting a value of the word S1[I1] at the address I1 of the first memory S1 using a value shifted, a first exchanging unit exchanging a value of an upper digit and a value of a lower digit of the word stored in the second internal memory;

a second random number generating unit generating values of addresses I4 and I5 from lower 2 bytes of the word stored in the second internal memory, generating a pseudo-random number R2 using a value of each word S2[I1] from the initial word to the final word of the second memory S2, a value of a word S2[I4] at the address I4 of the second memory S2, a value of a word S1[I5] at the address I5 of the first memory S1, and outputting;

a second state changing unit computing and shifting a value of the word S2[I4] at the address I4 of the second memory S2 and a value of the word S1[I5] at the address I5 of the first memory S1, and rewriting a value of a word S2[I1] at the address I1 of the second memory S2 using a value shifted, a second exchanging unit exchanging a value of an upper digit and a value of a lower digit of the word stored in the second internal memory;

a looping unit repeating operations of the first random number generating unit, the first state changing unit, and the first exchanging unit, and operations of the second random number generating unit, the second state changing unit, and the second exchanging unit until the stream length becomes the stream length stored in the stream length memory;

a buffer memory inputting and temporarily storing the pseudo-random number R1 output from the first random number generating unit and the pseudo-random number R2 output from the second random number generating unit and outputting as a pseudo-random number stream, and a rescheduling unit causing the key scheduling unit to operate when the stream length of the pseudo-random number output to the buffer memory becomes a predetermined rescheduling length.

6. A pseudo-random number generating method to be implemented by a pseudo-random number generator, being a computer having a key memory storing key information, a first memory S1 configured by a plurality of words and accessing a word S1[I] using an address I (I is an integer at least 0), and a second memory S2 being a memory configured by a same number of plurality of words with the first memory S1 and accessing a word S2[I] using the address I, and generating a pseudo-random number in word unit having a plurality of bytes, the method comprising:

setting a value for each of words of the first memory S1 and the second memory S2, and setting an initial value in a first internal memory and a second internal memory by an initializing unit;

key scheduling values of the words set in the first memory S1 and the second memory S2 using the key information stored in the key memory, and storing in the first memory S1 and the second memory S2 by a key scheduling unit;

generating a pseudo-random number by alternately using words which have been key scheduled and stored in the first memory S1 and the second memory S2 by a stream generating unit;

repeating the operations of the stream generating unit until the stream length of said pseudo-random number becomes a predetermined stream length of a random number to be generated; and causing the key scheduling unit to operate when the stream length of the pseudo-random number becomes a predetermined rescheduling length.

7. A non-transitory computer readable storage medium having stored thereon computer executable program for generating a pseudo-random number, the computer program when executed causes a pseudo-random number generator, being a computer having a key memory storing key information, a first memory S1 configured by a plurality of words and accessing a word S1[I] using an address I (I is an integer at least 0), and a second memory S2 being a memory configured by a same number of plurality of words with the first memory S1 and accessing a word S2[I] using the address I, and generating a pseudo-random number in word unit having a plurality of bytes, to implement processes of:

(1) setting a value for each of words of the first memory S1 and the second memory S2, and setting an initial value in a first internal memory and a second internal memory;

(2) key scheduling values of the words set in the first memory S1 and the second memory S2 using the key information stored in the key memory, and storing in the first memory S1 and the second memory S2;

(3) generating a pseudo-random number by alternately using words which have been key scheduled and stored in the first memory S1 and the second memory S2;

(4) repeating the step (3) until the stream length of said pseudo-random number becomes a predetermined stream length of a random number to be generated; and (5) causing the step (2) to operate when the stream length of the pseudo-random number becomes a predetermined rescheduling length.

* * * * *